(12) United States Patent
Rozmus

(10) Patent No.: US 7,391,128 B2
(45) Date of Patent: Jun. 24, 2008

(54) WIND GENERATOR SYSTEM USING ATTRACTIVE MAGNETIC FORCES TO REDUCE THE LOAD ON THE BEARINGS

(75) Inventor: John J. Rozmus, Berwyn, PA (US)

(73) Assignee: Rozlev Corp., LLC, Berwyn, PA (US)

( * ) Notice: Subject to any disclaimer, the term of this patent is extended or adjusted under 35 U.S.C. 154(b) by 0 days.

(21) Appl. No.: 11/827,538

(22) Filed: Jul. 12, 2007

(65) Prior Publication Data
US 2008/0012347 A1    Jan. 17, 2008

Related U.S. Application Data

(63) Continuation-in-part of application No. 11/027,510, filed on Dec. 30, 2004, now Pat. No. 7,327,060.

(51) Int. Cl.
*F03D 9/00* (2006.01)
*H02P 9/04* (2006.01)
*F16C 39/06* (2006.01)
*H02K 7/09* (2006.01)

(52) U.S. Cl. .......................... 290/55; 310/90.5
(58) Field of Classification Search .................. 290/55, 290/44; 310/90.5; 60/398; 415/2.1, 7, 905–908; 416/132 B
See application file for complete search history.

(56) References Cited

U.S. PATENT DOCUMENTS

| | | | |
|---|---|---|---|
| 833,635 A | 10/1906 | Rogers | 105/77 |
| 1,331,039 A | 2/1920 | Zoelly | 105/453 |
| 2,177,801 A * | 10/1939 | Erren | 290/55 |
| 3,125,964 A | 3/1964 | Silverman | 104/89 |
| 3,476,449 A | 11/1969 | Chaboseau et al. | 310/90.5 |
| 3,493,274 A | 2/1970 | Emslie et al. | 310/90.5 |
| 3,664,268 A | 5/1972 | Lucas et al. | 104/281 |
| 3,780,668 A | 12/1973 | Schwäarzler et al. | 104/286 |

(Continued)

FOREIGN PATENT DOCUMENTS

AT    92424    5/1923

(Continued)

OTHER PUBLICATIONS

A.V. Nikitin et al., "Magnetic Relieving of Guides Used in Automated Machining Systems", *Russian Engineering Research*, 12 (1992) No. 9, New York, US.

*Primary Examiner*—Julio C. Gonzalez
*Assistant Examiner*—Pedro J. Cuevas
(74) *Attorney, Agent, or Firm*—RatnerPrestia

(57) ABSTRACT

A wind generator system includes a stationary frame, a shaft, mechanical bearings and a stator and a rotor, along with magnetic components configured to reduce or substantially eliminate various loads imposed on the mechanical bearings by the system and by wind. In particular, magnetic components at a bearing closest to the vanes of attached to the shaft act to impart a force on the shaft opposing gravity. Magnetic components at a bearing along the shaft distal from the vanes act to impart a force on the shaft opposing a bending force exerted by the shaft on the bearing at that point. Additional magnetic components act to oppose gravity adjacent the stator and rotor. Still further magnetic components act to impart a force on the shaft opposing the wind force.

14 Claims, 14 Drawing Sheets

U.S. PATENT DOCUMENTS

| | | | |
|---|---|---|---|
| 3,860,300 A * | 1/1975 | Lyman | 310/90.5 |
| 3,877,761 A * | 4/1975 | Boden et al. | 310/90.5 |
| 3,890,019 A * | 6/1975 | Boden et al. | 310/90.5 |
| 4,062,097 A | 12/1977 | Riihinen | 29/116 |
| 4,167,295 A | 9/1979 | Glaser | 308/9 |
| 4,180,946 A * | 1/1980 | Heijkenskjold et al. | 451/24 |
| 4,259,908 A | 4/1981 | Feistkorn et al. | 104/281 |
| 4,367,413 A | 1/1983 | Nair | 290/52 |
| 4,387,935 A * | 6/1983 | Studer | 310/90.5 |
| 4,467,968 A | 8/1984 | Morishita et al. | 239/703 |
| 4,720,640 A * | 1/1988 | Anderson et al. | 290/43 |
| 4,896,065 A | 1/1990 | Tsuyama | 310/154 |
| 4,928,561 A * | 5/1990 | Fouche | 82/1.11 |
| 4,976,177 A * | 12/1990 | Fouche | 82/147 |
| 5,027,280 A * | 6/1991 | Ando et al. | 700/174 |
| 5,036,235 A | 7/1991 | Klecknur | 310/90.5 |
| 5,126,612 A * | 6/1992 | Girault | 310/90.5 |
| 5,220,222 A | 6/1993 | Shtipelman | 310/12 |
| 5,281,094 A * | 1/1994 | McCarty et al. | 416/147 |
| 5,347,190 A * | 9/1994 | Lewis et al. | 310/90.5 |
| 5,355,040 A * | 10/1994 | New | 310/90.5 |
| 5,355,042 A * | 10/1994 | Lewis et al. | 310/90.5 |
| 5,462,470 A * | 10/1995 | Oda et al. | 451/294 |
| 5,562,528 A * | 10/1996 | Ueyama et al. | 451/11 |
| 5,588,754 A * | 12/1996 | Miller | 384/609 |
| 5,739,609 A * | 4/1998 | Ueyama et al. | 310/90.5 |
| 5,747,907 A * | 5/1998 | Miller | 310/90 |
| 5,752,774 A * | 5/1998 | Heshmat et al. | 384/549 |
| 5,772,564 A * | 6/1998 | Taniguchi et al. | 483/7 |
| 5,804,900 A * | 9/1998 | Taniguchi et al. | 310/90.5 |
| 5,836,739 A | 11/1998 | Haramura et al. | 415/104 |
| 5,856,719 A * | 1/1999 | De Armas | 310/103 |
| 5,880,544 A * | 3/1999 | Ikeda et al. | 310/74 |
| 6,147,415 A * | 11/2000 | Fukada | 290/55 |
| 6,208,051 B1 * | 3/2001 | Ando | 310/90.5 |
| 6,375,424 B1 * | 4/2002 | Scarpa | 416/4 |
| 6,388,347 B1 * | 5/2002 | Blake et al. | 310/74 |
| 6,452,287 B1 * | 9/2002 | Looker | 290/55 |
| 6,476,513 B1 * | 11/2002 | Gueorguiev | 290/55 |
| 6,476,534 B1 * | 11/2002 | Vanderbeck et al. | 310/261 |
| 6,483,199 B2 * | 11/2002 | Umemoto et al. | 290/55 |
| 6,491,441 B2 | 12/2002 | Vignotto et al. | 384/559 |
| 6,504,260 B1 * | 1/2003 | Debleser | 290/44 |
| 6,566,775 B1 * | 5/2003 | Fradella | 310/90.5 |
| 6,653,756 B2 * | 11/2003 | Ueyama et al. | 310/90.5 |
| 6,720,695 B2 | 4/2004 | Coenen | 310/90.5 |
| 6,727,616 B1 * | 4/2004 | Gabrys et al. | 310/90.5 |
| 6,727,617 B2 | 4/2004 | McMullen et al. | 310/90.5 |
| 6,794,777 B1 * | 9/2004 | Fradella | 310/74 |
| 6,794,781 B2 * | 9/2004 | Razzell et al. | 310/114 |
| 6,809,450 B1 * | 10/2004 | Morrison | 310/90.5 |
| 6,836,036 B2 | 12/2004 | Dube | 310/64 |
| 6,867,520 B2 * | 3/2005 | Jennings | 310/90.5 |
| 6,911,741 B2 * | 6/2005 | Pettersen et al. | 290/44 |
| 6,942,556 B2 * | 9/2005 | Higuchi | 451/294 |
| 7,001,258 B2 * | 2/2006 | Higuchi | 451/294 |
| 7,023,118 B1 * | 4/2006 | Morrison | 310/90.5 |
| 7,032,859 B2 * | 4/2006 | Mohr | 244/12.2 |
| 7,042,109 B2 * | 5/2006 | Gabrys | 290/44 |
| 7,075,192 B2 * | 7/2006 | Bywaters et al. | 290/55 |
| 7,084,522 B2 * | 8/2006 | Wobben | 290/55 |
| 7,098,552 B2 * | 8/2006 | McCoin | 290/44 |
| 7,102,249 B2 * | 9/2006 | Wobben | 290/54 |
| 7,109,600 B1 * | 9/2006 | Bywaters et al. | 290/55 |
| 7,119,453 B2 * | 10/2006 | Bywaters et al. | 290/55 |
| 7,154,191 B2 * | 12/2006 | Jansen et al. | 290/55 |
| 7,154,193 B2 * | 12/2006 | Jansen et al. | 290/55 |
| 7,161,259 B2 * | 1/2007 | Lagerwey | 290/44 |
| 7,183,665 B2 * | 2/2007 | Bywaters et al. | 290/55 |
| 7,218,012 B1 * | 5/2007 | Edenfeld | 290/44 |
| 7,233,079 B1 * | 6/2007 | Cooper | 290/44 |
| 7,259,472 B2 * | 8/2007 | Miyake et al. | 290/55 |
| 7,282,808 B2 * | 10/2007 | Shibata et al. | 290/55 |
| 7,315,101 B2 * | 1/2008 | Shimada | 310/90.5 |
| 2001/0036565 A1 * | 11/2001 | Jennings | 429/10 |
| 2003/0042812 A1 | 3/2003 | Post | 310/90.5 |
| 2003/0110696 A1 | 6/2003 | Rennetaud et al. | 49/120 |
| 2003/0192449 A1 * | 10/2003 | Fisk et al. | 104/281 |
| 2004/0041407 A1 * | 3/2004 | Pettersen et al. | 290/44 |
| 2004/0041409 A1 * | 3/2004 | Gabrys | 290/55 |
| 2004/0107863 A1 | 6/2004 | Falter et al. | 104/281 |
| 2004/0113502 A1 | 6/2004 | Li et al. | 310/90.5 |
| 2004/0123766 A1 | 7/2004 | van den Bergh et al. | 104/281 |
| 2004/0247437 A1 * | 12/2004 | Otaki et al. | 416/132 B |
| 2005/0082836 A1 * | 4/2005 | Lagerwey | 290/44 |
| 2005/0082839 A1 * | 4/2005 | McCoin | 290/55 |
| 2005/0155450 A1 * | 7/2005 | Jennings | 74/572.12 |
| 2006/0001269 A1 * | 1/2006 | Jansen et al. | 290/44 |
| 2006/0006658 A1 * | 1/2006 | McCoin | 290/55 |
| 2006/0012182 A1 * | 1/2006 | McCoin | 290/55 |
| 2006/0016929 A1 * | 1/2006 | Mohr | 244/12.2 |
| 2006/0071575 A1 * | 4/2006 | Jansen et al. | 310/266 |
| 2006/0120872 A1 * | 6/2006 | Okubo et al. | 416/132 B |
| 2007/0273219 A1 * | 11/2007 | Shimada | 310/52 |
| 2007/0278796 A1 * | 12/2007 | Power et al. | 290/43 |
| 2008/0012346 A1 * | 1/2008 | Bertolotti | 290/55 |

FOREIGN PATENT DOCUMENTS

| | | |
|---|---|---|
| DE | 57447 C | 9/1890 |
| DE | 3810338 A1 | 10/1989 |
| DE | 4116212 A1 | 11/1992 |
| EP | 1207299 A2 * | 5/2002 |
| EP | 1717468 A1 * | 11/2006 |
| JP | 55-006056 A | 1/1980 |
| JP | 55-123025 A | 9/1980 |
| JP | 62-165019 | 7/1987 |
| JP | 2000170766 A * | 6/2000 |
| SU | 1362510 A1 | 12/1987 |
| WO | WO-2004/007984 A1 | 1/2004 |
| WO | WO 2005003580 A1 * | 1/2005 |
| WO | WO 2007101402 A1 * | 9/2007 |

* cited by examiner

WIND GENERATOR SYSTEM USING ATTRACTIVE MAGNETIC FORCES TO REDUCE THE LOAD ON THE BEARINGS

RELATED APPLICATION

This U.S. non-provisional application is a continuation-in-part application that claims priority to U.S. patent application Ser. No. 11/027,510, filed Dec. 30, 2004, now U.S. Pat. No. 7,327,060 the entire contents of which are incorporated by reference herein.

TECHNICAL FIELD

The present invention relates generally to bearing assemblies having a mechanical component and a magnetic component. More particularly, the present invention relates to radial bearing assemblies, suitable for use in a vehicular wheel, and linear bearing assemblies, suitable for use in connection with a rail line. The present invention also relates to wind generator systems for generating electricity that include such radial bearing assemblies.

BACKGROUND OF THE INVENTION

Bearings which are solely mechanical necessarily involve mechanical contact between the components, leading to well-known problems associated with friction, leading to wear and energy losses. Repulsive magnetic forces have been utilized in magnetic bearings, for example, to provide a non-contact, low-friction bearing. However, repulsive forces in general are not as strong as attractive magnetic forces with all other parameters being the same. The use of attractive magnetic forces in a bearing assembly raises a concern that the bearing assembly may become unstable in the direction of the attractive forces. In particular, there is a concern that the two magnetic components will come into contact with one another due to an increased attractive force at a particular point. Despite this concern, the use of attractive magnetic forces in bearing assemblies remains of interest in the prevention of frictional wear and energy losses in mechanical assemblies.

Recent concerns regarding global warming, dependence on oil, and limited energy resources have increased interest in the development of more efficient alternative energies. Although environmentally friendly energies such as geothermal, solar, and wind power are proven sources of renewable energy, these technologies have not been widely accepted due to their relatively low energy output at the expense of high maintenance costs. Wind generator systems, for example, require many mechanical components that experience frictional wear from mechanical contact and necessitate frequent inspection and replacement of mechanical components. While many developments have been made in the art of renewable energies and wind generator systems in particular, there remains a need for further improvements.

SUMMARY OF THE INVENTION

According to an exemplary embodiment of the present invention, a wind generator system for generating electricity is provided. The wind generator system includes a stationary frame having an axis and a shaft disposed along the axis. The shaft is coupled to one or more fan blades that are adapted to receive a wind force such that the shaft radially rotates about the axis. The stationary frame includes a magnetic source and the shaft comprises a highly magnetically permeable material. The stationary frame and shaft are positioned with respect to each other about the axis to provide an annular gap between a surface of the magnetic source parallel to the axis and a surface of the magnetic source perpendicular to the axis. A magnetic field is provided across the annular gap to impart a magnetic attractive force on the shaft in a first direction opposing gravity, and in a second direction opposing the wind force. The wind generator system also includes a set of mechanical bearings coupled to the shaft and the stationary frame. The mechanical bearings allow radial rotation of the shaft about the axis relative to the stationary frame and provide axial alignment of the shaft and the stationary frame. The shaft and the one or more fan blades are configured to exert against the set of mechanical bearings a load in the direction of gravity. The system also includes a stator and rotor configured to rotate relative to one another upon rotation of the shaft to generate electricity.

In another embodiment, a bearing assembly has an inner magnetic component, at least one outer magnetic component, and a mechanical device for controlling relative movement between the inner component and the at least one outer component in first and second directions while permitting relative movement between the inner component and the at least one outer component in a third direction. At least one of the inner component or the at least one outer component comprises a magnetic source. The components together define at least one magnetic gap at which attractive magnetic forces cause a first load in a direction opposing gravity to be exerted across the gap and against the component adapted to receive a supplemental load, thereby urging the component adapted to receive the supplemental load upward against the mechanical device.

In a further embodiment according to the present invention, the bearing assembly is a radial bearing assembly and comprises a radially inner component having an axis and a radially outer component disposed for relative rotation with the radially inner component around the axis. One of the radially inner component and the radially outer component is a rotating component and the other is a stationary component. One of the radially inner component and the radially outer component is a component adapted to receive a supplemental load. At least one of the radially inner component and the radially outer component comprises a magnetic source and the other component comprises a highly magnetically permeable material. The radially inner component and the radially outer component are positioned to provide an annular gap across which a magnetic field, formed from the magnetic moment, imparts a magnetic attractive force between the radially inner component and the radially outer component. The bearing assembly also includes a set of mechanical bearings coupled to the radially inner component and the radially outer component for allowing relative rotation between the components and for axially aligning the components. The components are configured to exert against the set of mechanical bearings a first load in a first direction opposing gravity across the gap and against the component adapted to receive a supplemental load. The assembly also includes means, attached to the component adapted to receive the supplemental load, for accepting a supplemental component providing the supplemental load on that component in a second direction opposite the first direction to oppose the first load.

In a further embodiment according to the present invention, the bearing assembly is a radial bearing assembly and comprises a radially inner component having an axis and a radially outer component disposed for relative rotation with the radially inner component around the axis. One of the radially inner component and the radially outer component is a rotating component and the other is a stationary component. One of the radially inner component and the radially outer component is a component adapted to receive a supplemental load. At least one of the radially inner component and the radially outer component comprises a magnetic source and the other component comprises a highly magnetically permeable material. The radially inner component and the radially outer component are positioned to provide an annular gap across which a magnetic field, formed from the magnetic moment, imparts a magnetic attractive force between the radially inner component and the radially outer component. The bearing assembly also includes a set of mechanical bearings coupled to the radially inner component and the radially outer component for allowing relative rotation between the components and for axially aligning the components. The components are configured to exert against the set of mechanical bearings a first load in a first direction opposing the supplemental load. The component adapted to receive the supplemental load includes a supplemental component for transferring the supplemental load on the component adapted to receive the supplemental load in a second direction opposite the first direction to oppose the first load.

In a further embodiment according to the present invention, the bearing assembly is a linear bearing assembly and comprises a longitudinally-extending inner component, at least one longitudinally-extending outer component, a housing, and means for controlling lateral and vertical movement between the inner component and the at least one outer component. The inner component comprises at least one member having a top engaging surface, a bottom engaging surface, and at least one magnetic surface (which may also serve as an engaging surface), and has at least two side engaging surfaces and an axis. The at least one outer component has at least one magnetic surface and is disposed for relative longitudinal movement with the inner component along the axis. One of the inner component and the at least one outer component is a moving component, and the other is a stationary component. At least one of the inner component and the at least one outer component comprise a magnetic source disposed to provide a magnetic moment and the other component comprises a highly magnetically permeable material. The inner component and the at least one outer component are positioned to provide at least two gaps defined by the magnetic surfaces of the components. Across the gaps, a magnetic field, formed from the magnetic moment, imparts a magnetic attractive force between the inner component and the at least one outer component and causes a first load in a first direction opposing gravity to be exerted across the gap and against the component adapted to receive a supplemental load. The housing is connected to each of the at least one outer component for allowing relative longitudinal movement between the outer and the inner components.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. Included in the drawing are the following figures.

DETAILED DESCRIPTION OF THE INVENTION

Figure 1A:
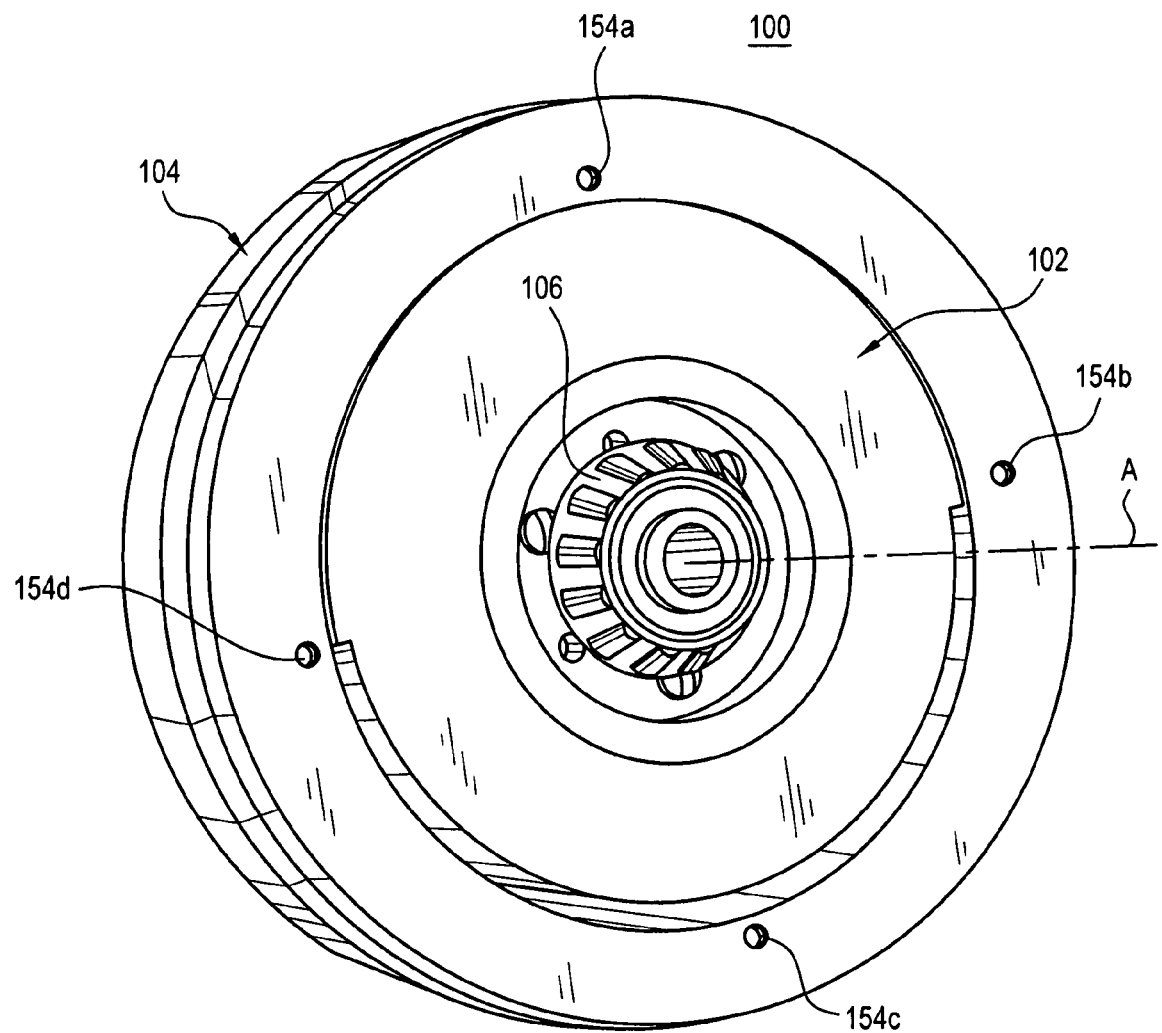
FIG. 1A is a perspective view of certain parts of a radial bearing assembly according to an embodiment of the present invention without the mechanical bearing acting on the magnetic components.

A general embodiment of the present invention is directed to the utilization of attractive magnetic forces of magnetic components of a bearing assembly. A bearing assembly may consist only of the two components of the bearing which move relative to one another or it may include the two components and other elements, such as a mechanical bearing or similar device for controlling movement in one or more directions, shaft, a housing, a carriage which might be mounted to the housing, a base, or other known elements of bearing assemblies having both magnetic and mechanical components. The magnetic bearing according to the present invention can be used in a wide variety of industrial applications requiring a bearing assembly and can be in the form of a radial bearing assembly or a linear bearing assembly. The radial bearing assembly can be used in connection with a vehicle, such as a bicycle or an automotive vehicle, or other load bearing assemblies requiring radial bearings, such as windmills and turntables, for example. The linear bearing assembly can be used in connection with a train or other rail transportation system.

According to a general embodiment of the invention, a bearing assembly has an inner magnetic component and at least one outer magnetic component. The components are the pieces of the bearing assembly which move relative to one another and either provide a magnetic field or are least capable of being magnetized. The assembly also includes some sort of mechanical device, such as a set of bearings, wheels exerting force on one of the components, or flanges, for controlling relative movement between the components in first and second directions while permitting movement between the components in a third direction. The types of magnetic bearings according to the present invention include radial bearings, in which case the direction of relative movement of the components is rotational, and linear bearings, in which case the direction of relative movement of the components is longitudinal movement. At least one of the inner components or the outer components comprises a magnetic source. As used herein, a magnetic source (or source of magnetism) is either a permanent magnet material or an electromagnet. In the case of an electromagnet, preferably a direct current source of power is used. As is well known, an electromagnet comprises a core of highly magnetically permeable material and a coil of wire wound on the core, and the core is magnetized by passing a current through the coil of wire. The two components define at least one magnetic gap at which attractive magnetic forces cause a first load in a direction opposing gravity to be exerted across the gap and against whichever component is adapted to receive a supplemental load. This attractive magnetic force urges the component adapted to receive the supplemental load upward against the mechanical device (and thus upward against the supplemental load, which is typically the weight of a supplemental device).

FIG. 1A shows a radially bearing assembly 100 comprising radially inner component 102 having an axis A, which is the central axis of the radially inner component. Bearing assembly 100 also comprises a radially outer component 104 which is disposed for relative rotation with the radially inner component around the axis. As such, either radially inner component 102 or radially outer component 104 may be a rotating component while the other is a stationary component. FIG. 1A shows the position of radially inner component 102 with respect to radially outer component 104 without any external force acting on the components by a mechanical device, such as a set of mechanical bearings. In particular, due to the attractive forces existing between the two components (for reasons discussed below), the components move relative to one another such that, at the closest areas of contact, the components engage one another which causes the gap at the opposite end between the two components to widen. In particular, the upper quadrants of radially inner component 102 and radially outer component 104 are touching one another while the space between the two components at the lower quadrants is increased. Of course, the embodiment shown in FIG. 1A could not be used as a bearing but is being shown merely to explain how the attractive magnetic forces between the two components would act in the absence of a set of mechanical bearings.

Figure 1B:
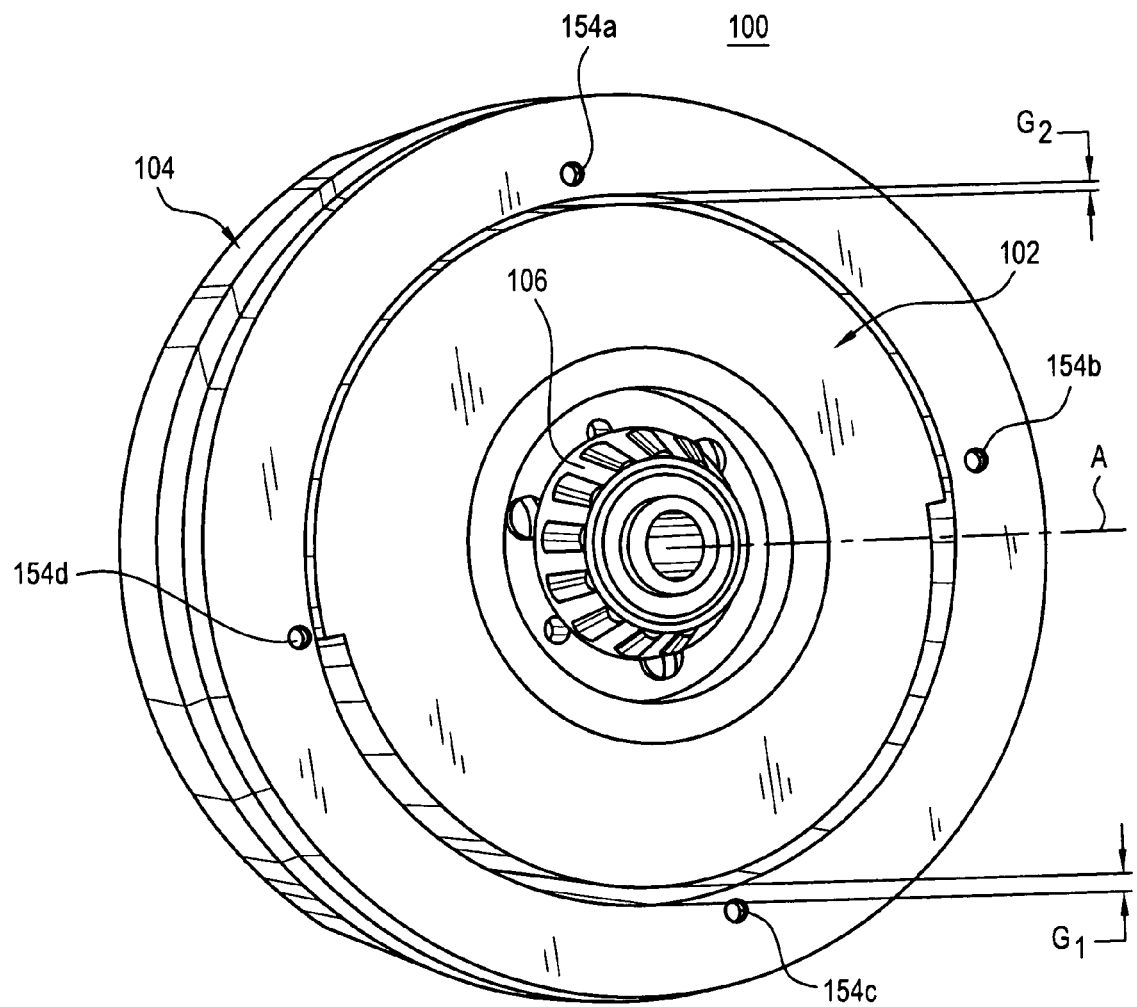
FIG. 1B is a perspective view of the same parts of the radial bearing assembly shown in FIG. 1A but showing how the mechanical bearings influence the magnetic components of the radial bearing assembly.

On the other hand, the view shown in FIG. 1B shows the relative orientation of radially inner component 102 and radially outer component 104 after being acted upon by a mechanical device, such as a set of mechanical bearings. The bearings or other mechanical device (not shown in FIG. 1B) serve to orient the components relative to one another such that the space between the two components in one quadrant (e.g., $G_2$ at the upper quadrant) is less than the space between two components at another quadrant (e.g., $G_1$ of the lower quadrant). As used herein, the term "quadrant" shall mean an arcuate portion of the gap between the two components and could be up to half of the arc of the gap or one quarter of the arc of the gap or something less. For example, the upper quadrant could be an arcuate portion of 45, 60, 90, or 135 degrees, while the lower quadrant would be a complementary angle of 315, 300, 270, and 225 degrees, respectively. In order to maintain the same axial force when reducing the range of the upper quadrant when using the same materials, it would be necessary to increase the axial length (along axis A as shown in FIG. 1A). Accordingly, it can be appreciated that if an attractive magnetic force exists between the components and the radially inner component is the stationary component in FIG. 1B, then a net force acting upward as shown in FIG. 1B would be acting on radially inner component 102.

Figure 2A:
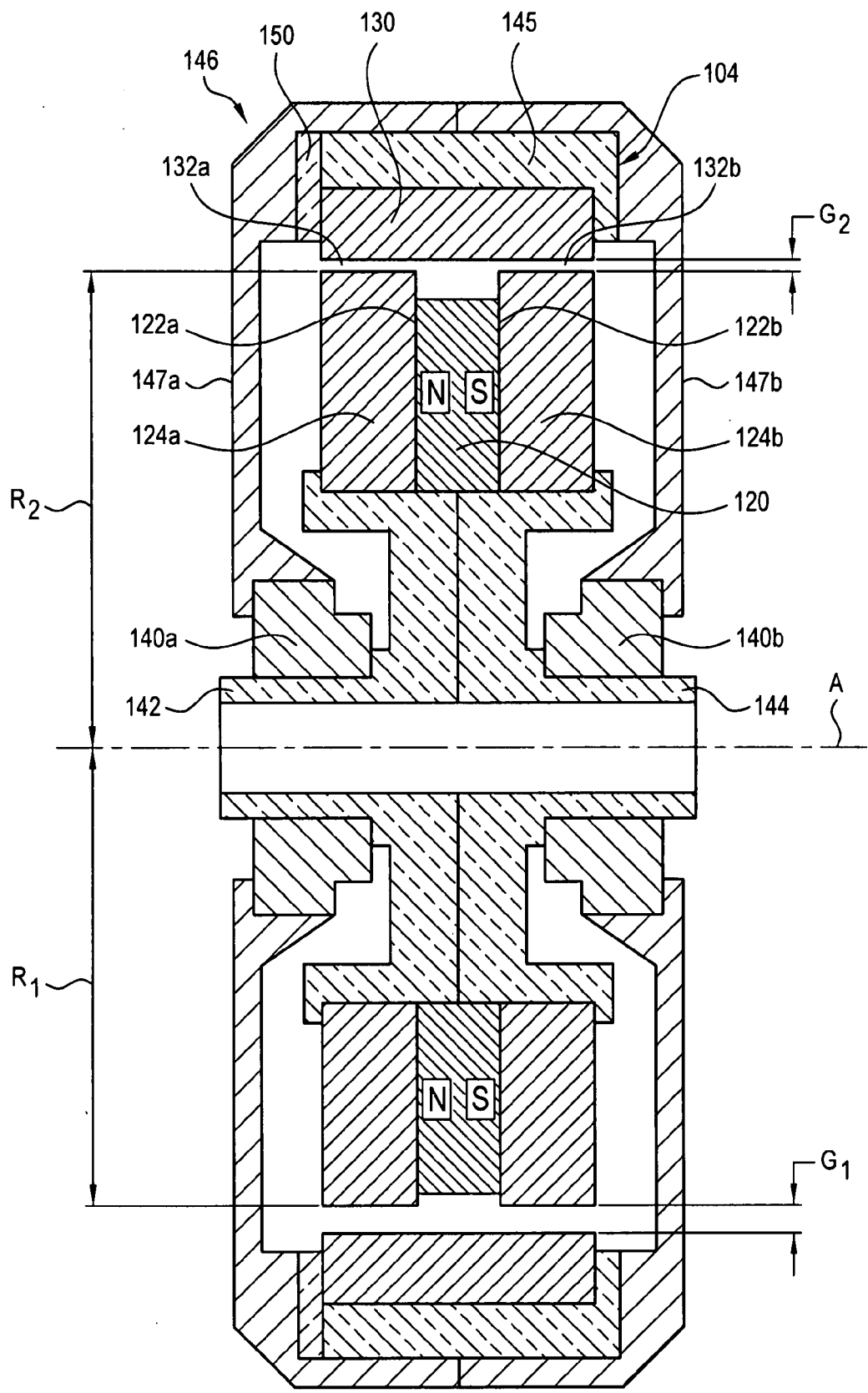
FIG. 2A is a radial cross-sectional view of the radial bearing assembly incorporating the parts shown in FIGS. 1A and 1B in one embodiment of the present invention.

FIG. 2A shows the radial bearing assembly of FIGS. 1A and 1B in a radial cross-sectional view. As shown in FIG. 2A, radially inner component 102 comprises a magnetic source 120 which is disposed to have a magnetic moment in the axial direction, as shown for example by the polarities north and south in FIG. 2A. Magnetic source 120 may either be a permanent magnetic material or an electromagnetically excited material. If a permanent magnetic material is used, any known material, such as non-rare earth permanent magnets or rare earth magnets may be used. Non-rare earth magnets include alnico (aluminum-nickel-cobalt), and rare earth magnets include neodymium-iron-boron and samarium-cobalt magnets. The material used will depend on the needs of the particular application, and it is well within the knowledge of one having ordinary skill in the art to select a suitable material. The components might also include a surface coating to serve as a protective layer, which is also well-known in the art. On the other hand, if magnetic source is an electromagnetically excited material, magnetic source 120 would include a core of highly magnetically permeably material and a coil of wire wound around the core, with the core capable of being magnetized by passing a current through the coil of wire.

Radially inner component also includes a first pole piece 124a and a second pole piece 124b. First pole piece 124a is in magnetic contact with the magnetic source at a first axial end 122a of magnetic source 120, while second pole piece 124b is in magnetic contact with the magnetic source at a second axial end 122b of the magnetic source. As noted above, first axial end 122a of magnetic source 120 has a first polarity (e.g., north), and second axial end 122b of the magnetic source has a second polarity (e.g., south) opposite the first polarity. First pole piece 124a and second pole piece 124b are made of a highly magnetically permeable material. A highly magnetically permeable material is one which readily conducts a magnetic field. Knowledge of and the selection of the particular highly magnetically permeable material to be used is well within the skill of an artisan in the field. Such a material selected should be sufficiently magnetically permeable to conduct the magnetic field from magnetic source 120 in a way which permits an adequate magnetic force between the two components of the bearing assembly for the particular application at hand. Typically, such materials include iron, nickel iron, or low carbon steel.

Figure 2B:
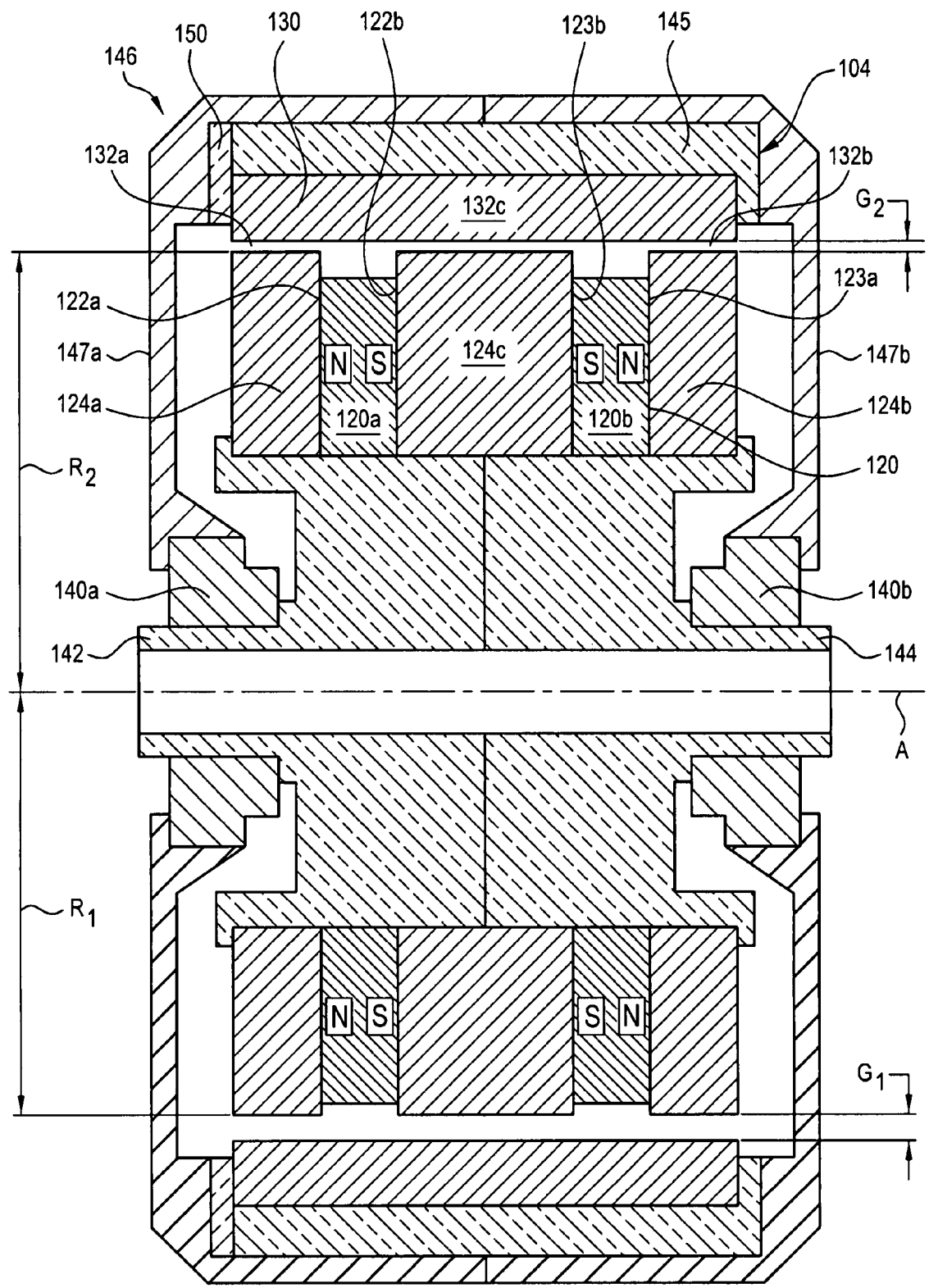
FIG. 2B is a radial cross-sectional view of the radial bearing assembly incorporating the parts shown in FIGS. 1A and 1B in an alternative embodiment of the present invention.

In an alternative embodiment, FIG. 2B illustrates radially inner component 102 as comprising two magnetic sources 120a and 120b which are disposed to have a magnetic moment in the axial direction, as shown for example by the polarities north and south in FIG. 2B. Radially inner component also includes first pole piece 124a, second pole piece 124b, and intermediate pole piece 124c. First pole piece 124a is in magnetic contact with first magnetic source 120a at a first axial end 122a of first magnetic source 120a, while second pole piece 124b is in magnetic contact with second magnetic source 120b at a first axial end 123a of second magnetic source 120b, and intermediate pole piece 124c is in magnetic contact with first magnetic source 120a at second axial end 122b of first magnetic source 120a as well as with second magnetic source 120b at second axial end 123b of second magnetic source 120b. As noted above, first axial ends 122a, 123a of the magnetic sources has a first polarity (e.g., north), and second axial ends 122b, 123b of the magnetic sources has a second polarity (e.g., south) opposite the first polarity. First pole piece 124a, second pole piece 124b, and intermediate pole piece 124c are made of a highly magnetically permeable material.

Those skilled in the art will recognize that by using two or more magnetic sources (e.g., 120a and 120b in FIG. 2B), additional magnetic gaps are created (e.g., 132a, 132b, and 132c in FIG. 2B) over which an attractive upward force may be provided. While FIG. 2B illustrates the use of two magnetic sources, it is contemplated that any number of magnetic sources may be used, where one or more intermediate pole pieces are introduced between respective ones of the magnetic sources.

In the embodiment shown in FIGS. 1A, 1B, 2A, and 2B, radially inner component 102 is a stationary component and radially outer component 104 is the moving (or rotating) component. In this embodiment, radially inner component 102 has a reduced radius $R_1$ at its lower quadrant (as shown best in FIG. 2A) when compared with the radius $R_2$ at its upper quadrant. This has the effect of making the annular gap $G_1$ at the lower quadrant wider than the annular gap $G_2$, which is at the top quadrant. As radially outer component 104 also includes a highly magnetically permeable material 130, a magnetic field is thereby created between radially inner component 102 and radially outer component 104. This field may be viewed as extending from first axial end 122a of magnetic source 120, across first pole piece 124a, across a first annual gap 132a defined by first pole piece 124a and highly magnetically permeable material 130 of radially outer component 104, across highly magnetically permeable material 130 of radially outer component 104, across a second annular gap 132b defined by second pole piece 124b and highly magnetically permeable material 130 of radially outer component 104, and then back to magnetic source at the second axial end 122b. Because of the difference in gap widths of $G_1$ and $G_2$, however, it can be appreciated that a greater attractive force exists between the two components at the upper quadrant than at the lower quadrant. The magnitude of this attractive force can be adjusted by varying the difference between the gap widths at these two quadrants ($G_1$-$G_2$) as well as by the selection of the materials.

Bearing assembly 100 also includes a set of mechanical bearings 140a and 140b. In an embodiment in which radially bearing assembly 100 is used for allowing rotation of a wheel relative to a shaft of a vehicle, mechanical bearings are tapered roller bearings. As can be seen from FIG. 2A, mechanical bearings 140a and 140b are coupled to radially inner component 102 along at least one edge of a spindle 142 which is mounted to a shaft 144. Mechanical bearings 140a and 140b are also coupled to radially outer component 104 along at least one edge of a housing 146. Spindle 142 is rigidly mounted to radially inner component 102, and housing 146 is rigidly mounted to radially outer component 104. To maintain the magnetic field, spindle is a non-magnetic material, such as brass, and a non-magnetic material portion 145 and a spacer 150 (also non-magnetic) surround the highly magnetically permeable material 130 of radially outer component 104. In this embodiment, both non-magnetic material portion 145 and spacer 150 are part of radially outer component 104, but the radially outer component may consist solely of the highly magnetically permeable material. Although not shown, mechanical bearings 140a and 140b can be placed elsewhere so that they directly engage radially inner component 102 and radially outer component 104.

Mechanical bearings 140a and 140b serve to axially and radially align radially inner component 102 and radially outer component 104 with respect to one another. As used in connection with this embodiment, reference to the axial direction (such as in "axially aligned") means the direction along axis A. Accordingly, as shown, the axially outer edges of pole pieces 124a and 124b are in line with the axially outer edges of highly magnetically permeable material 130 of radially outer component 104. Mechanical bearing 140a and 140b radially align radially inner component 102 and radially outer component 104 by setting the width of gaps $G_1$ and $G_2$. The desired radial clearance between the two components can be selected readily and depends upon the magnetic materials being used, the force desired, and manufacturing tolerances. As can be appreciated, radially inner component 102 and radially outer component 104 are configured to exert against the mechanical bearings a first load in a first direction opposing gravity exerted by the moving component across the gap and against the stationary component. Accordingly, when the mechanical bearings are not present, the configuration shown in FIG. 1A results.

Bearings assembly 100 also includes means for accepting a supplemental component which provides a supplemental load on a component adapted to receive the supplemental load, namely either radially inner component 102 or radially outer component 104. In the embodiments shown in FIG. 2A or 2B, radially inner component 102 is the component adapted to receive the supplemental load, which might be, for example, one-half of the weight of a bicycle and rider or one-quarter the weight of a car and passengers (in both cases, excluding the wheels). As shown in FIG. 2A or 2B, the items for accepting the supplemental load would include a shaft 144 which is attached to radially inner component 102 by spindle 142. The items for accepting the supplemental load could also include any type of fastener for mounting the supplemental component to the stationary component. This could include a bracket, grip, fastener (such as a screw, bolt, and/or nut, as needed) which may or may not be mounted to the shaft.

As mentioned above, the embodiment shown in FIGS. 1A, 1B, and 2 may be applicable, for example, for a bicycle wheel, in which case the radially outer component 104 is directly coupled to part of the wheel (e.g., by affixing housing 146 to the wheel hub or rim) and radially inner component 102 is coupled to the frame of the bicycle in a known manner. By imparting a force against the weight of the component adapted to receive the weight of the bicycle (or an automotive vehicle), the bearing assembly of the present invention significantly reduces the load on the mechanical bearings and, consequently, significantly reduces the frictional losses associated with the mechanical bearings. Accordingly, the radial bearing assembly of the present invention should lead to increased gas mileage for automotive vehicles and allow an operator of a bicycle to expend less energy to cover the same distance. For braking, a brake pad may be mounted to the shaft or some other stationary component of the vehicle and then engage against a surface of the radially outer component 104 or housing 146 or the wheel itself (not shown).

An alternative embodiment can be easily adapted in which radially inner component 102 is the moving component and radially outer component 104 is the stationary component. This may be suitable, for example, for driving a fly wheel attached to radially inner component 102. In this embodiment, the radially outer component would have a decreased annular height at the lower quadrant, and the radially inner component would have the same radius around its circumference. With this configuration, an increased attractive magnetic force would exist between the components at the upper quadrant, thereby offsetting some of the weight of the fly wheel.

Figure 2C:
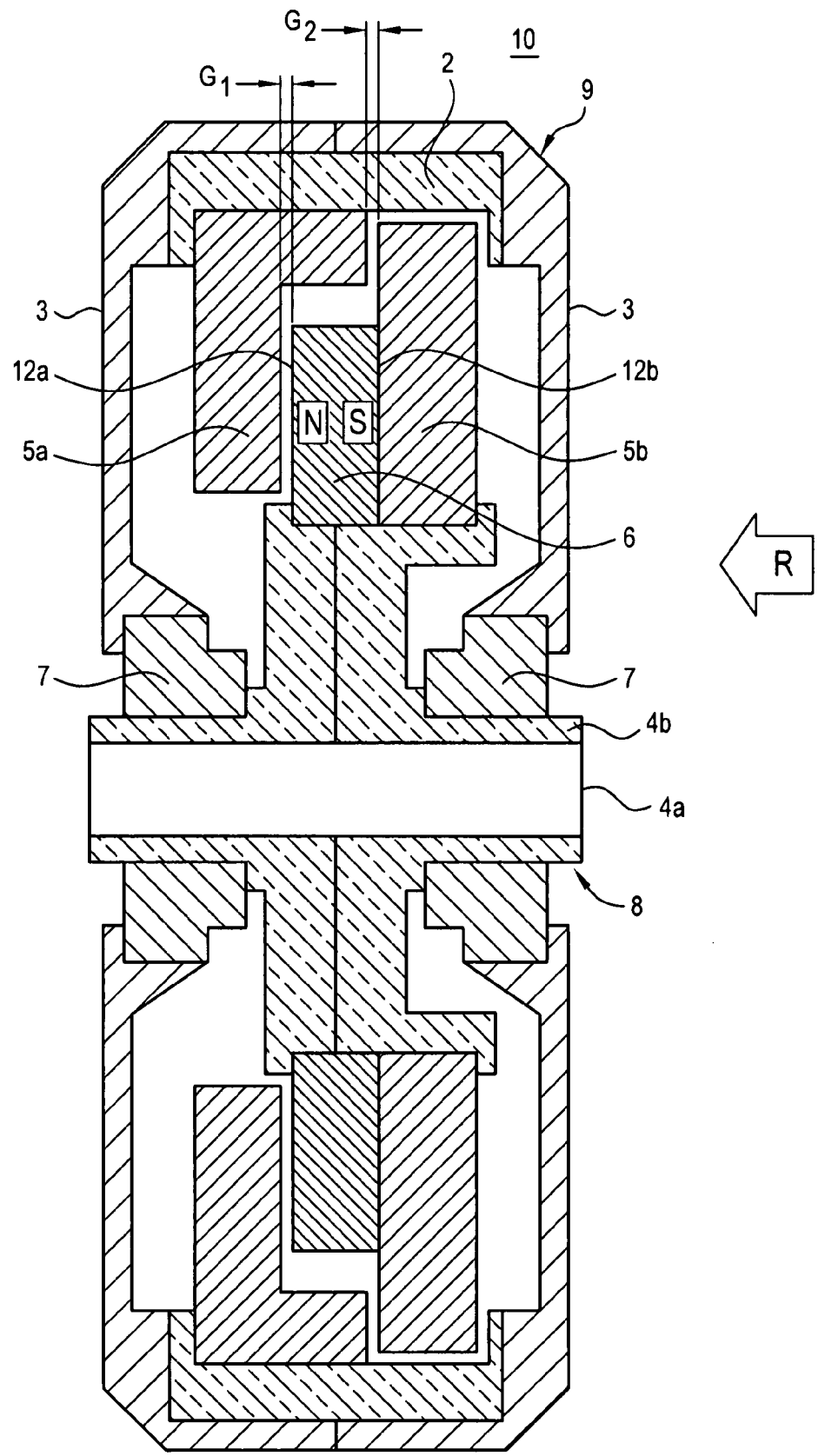
FIG. 2C is a radial cross-sectional view of a radial bearing assembly incorporating parts for an alternative embodiment of the present invention.

Alternatively, another embodiment of the present invention, shown in FIG. 2C, comprises magnetic bearing assembly 10 utilized to compensate horizontal displacement force R. In the embodiment shown in FIG. 2C, radially inner component 8 may be the stationary component and radially outer component 9 may be the moving (or rotating) component, or vice versa in an alternate embodiment. Radially inner component 8 comprises magnetic source 6 attached to spindle 4b and disposed to have a magnetic moment in the axial direction, as shown, for example, by the polarities north and south in FIG. 2C. Magnetic source 6 may either be a permanent magnetic material or an electromagnetically excited material, as described above.

Radially inner component 8 also includes inner pole piece 5b. Inner pole piece 5b is made of a highly magnetically permeable material and is in magnetic contact with magnetic source 6 at a second axial end 12b of the magnetic source. As noted above, first axial end 12a of magnetic source 6 has a first polarity (e.g., north), and second axial end 12b of the magnetic source has a second polarity (e.g., south) opposite the first polarity. Radially outer component 9 includes outer pole piece 5a made of highly magnetically permeable material. Accordingly, a magnetic field is created between radially inner component 8 and radially outer component 9. This field may be viewed as extending from first axial end 12a of magnetic source 6, across first axial gap $G_1$ defined by outer pole piece 5a and magnetic source 6, across outer pole piece 5a, across second axial gap $G_2$ defined by outer pole piece 5a and inner pole piece 5b, across inner pole piece 5b, and then back to magnetic source 6 at the second axial end 12b. Inner and outer components 8 and 9 are joined with mechanical bearings 7, which are coupled to radially inner component 8 along at least one edge of a spindle 4b which is mounted to a shaft 4a. Mechanical bearings 7 are also coupled to radially outer component 9 along at least one edge of an outer housing 3. Spindle 4b is rigidly mounted to radially inner component 8, and housing 3 is rigidly mounted to radially outer component 9.

It may be appreciated, therefore, that an attractive force exists between the inner and outer components across the first axial gap $G_1$ and the second axial gap $G_2$. This magnetic attractive force between the inner and outer components, therefore, opposes a horizontal force R incident on radially outer component 9 (if radially inner component 8 is stationary) in the direction indicated by the arrow in FIG. 2C. In the absence of the attractive magnetic force, horizontal force R pushes radially outer component 9 relative to radially inner component 8, thereby creating an undesirable horizontal force on bearings 7. The attractive force between radially inner component 8 and radially outer component 9, however, opposes the undesirable horizontal force on bearings 7 in a substantially equal and opposite direction. The magnitude of the magnetic attractive force can be adjusted by varying the difference between the gap widths at the quadrants $G_1$ and $G_2$, as well as by the selection of the materials. Those skilled in the art will recognize that the present embodiment may also be configured to compensate for a horizontal force incident radially inner component 8 (if radially outer component 9 is stationary); additionally, the current embodiment may also be adapted to compensate for undesirable vertical forces on bearings 7, such as those from the weight of the fan and/or fan blades, for example.

Figure 2D:
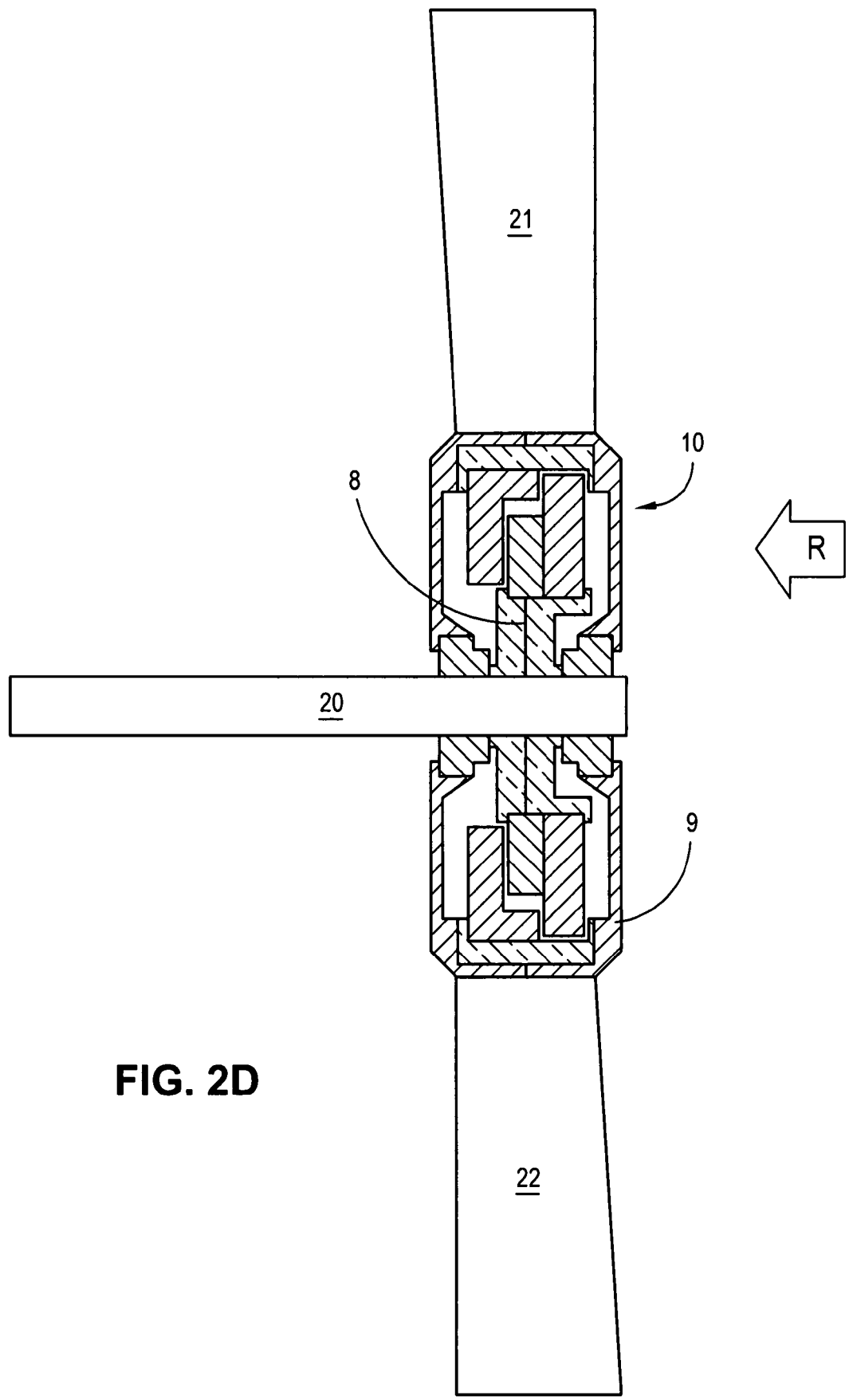
FIG. 2D is a radial cross-sectional view of a partial windmill assembly incorporating the radial bearing assembly shown in FIG. 2C in an alternative embodiment of the present invention.

In a further embodiment of the invention, shown in FIG. 2D, magnetic bearing 10 shown in FIG. 2C may be used in a windmill application. In such an embodiment, radially inner component 8 may be part of a stationary shaft 20 and radially outer component 9 may be part of a rotating fan having fan blades 21 and 22 for capturing horizontal force R and converting it to a rotational force for rotational motion of the fan relative to the shaft. Some portion of horizontal force R will transfer to radially outer component 9, however, creating an undesirable horizontal force on bearings 7. The magnetic attractive force between radially inner component 8 and radially outer component 9 opposes and substantially cancels the undesirable horizontal force component. Those skilled in the art will recognize that the fan blades of a windmill may be mechanically adjusted so that the magnitude of the undesirable horizontal force is kept constant and approximately equivalent to the magnitude of the attractive force between inner and outer components 8 and 9. Alternatively, the radially outer component 9 may be part of a stationary shaft and the radially inner component 8 may be part of a rotating fan having fan blades for capturing horizontal force R.

In another embodiment of the invention (not shown in FIG. 2C), magnetic bearing 10 shown in FIG. 2C may be used in a turntable application. In such an embodiment, radially inner component 8 may be part of a stationary shaft, and radially outer component 9 may be part of a rotating turntable, where magnetic bearing 10 is arranged such that horizontal force R represents the force of gravity pushing down on the rotating turntable surface. Accordingly, those skilled in the art will recognize that, in the absence of a magnetically attractive force between inner and outer components 8 and 9, the force of gravity R on radially outer component 9 is opposed by a vertically normal force from bearings 7. The magnetically attractive force between radially inner component 8 and radially outer component 9, however, opposes and substantially cancels the vertically normal force from bearings 7. Alternatively, the radially outer component 9 may be part of a stationary shaft and the radially inner component 8 may be part of a rotating turntable, where magnetic bearing 10 is arranged such that horizontal force R represents the vertically normal force from bearings 7 that opposes the force of gravity on radially inner component 8.

While the embodiment shown in FIGS. 1A, 1B, and 2 include a magnetic source in only the radially inner component, either component or both components could include a magnetic source to provide or strengthen the magnetic field. While it is envisioned that most applications would include a permanent magnetic material as the magnetic source material, an electromagnetically excited material may be used as part of either or both components. Preferably, however, the moving component is not an electromagnetically excited material because of the difficulty in designing an electromagnet as a moving component.

In order to assemble the radial bearing assembly as shown in FIGS. 1A, 1B, and 2, radially inner component (or a rotor) is first assembled by bringing one of the pole pieces (e.g., pole piece 124a) into contact with magnetic source 120 in a sliding manner, namely by arranging the two components in their ultimate planes and then bringing them together peripherally by sliding one over the other until they are axially aligned. Second pole piece 124b is then slid over the opposing face of magnetic source 120 in the same manner to obtain a "rotor sandwich." The spindle is then placed on the rotor assembly from both sides in the form of two spindle halves and the spindle halves are attached together by fasteners (not shown) such as screws into threaded recesses. To ensure proper alignment, magnetic source 120 may have a radially-inwardly protruding notch at its center and spindle halves 124a and 124b may have corresponding recesses.

Separately, the stator housing and outer brass and magnetic ring are assembled in any known manner. One way in which to assemble these components is to place half of the outer housing 146 (i.e., housing half 147a) onto the base of an assembly fixture which has a central pin and guide plates extending upward from the base. The guide plates are attached to the base at its outer periphery and are adjustable relative to the base and abut against the outer periphery of outer housing 146 in a manner to center the bearing assembly. A brass spacer ring 150 (shown in FIGS. 2A and 2B) is placed on the proper surface of housing half 147a. Bearings 140a are then installed in their place in outer housing half 147a with the central pin in place. Then, the rotor assembly is then pushed into the stator (i.e., housing half 147a) past the magnetic forces and into its correct position. After bearing 147b is put in place and non-magnetic material portion 145 is put in place, the other housing half 147b is then placed over the rotor and stator and screwed into rotor sandwich with, for example, four screws extending through screw holes (not shown) in housing half 147a and into threaded recesses 154a-d of the pole pieces. Housing half 147a is screwed into these components until the tapered bearings are engaged fully, at which time the rotor is concentrically positioned with the stator. Alternatively, the parts could be assembled then magnetized.

Figure 3A:
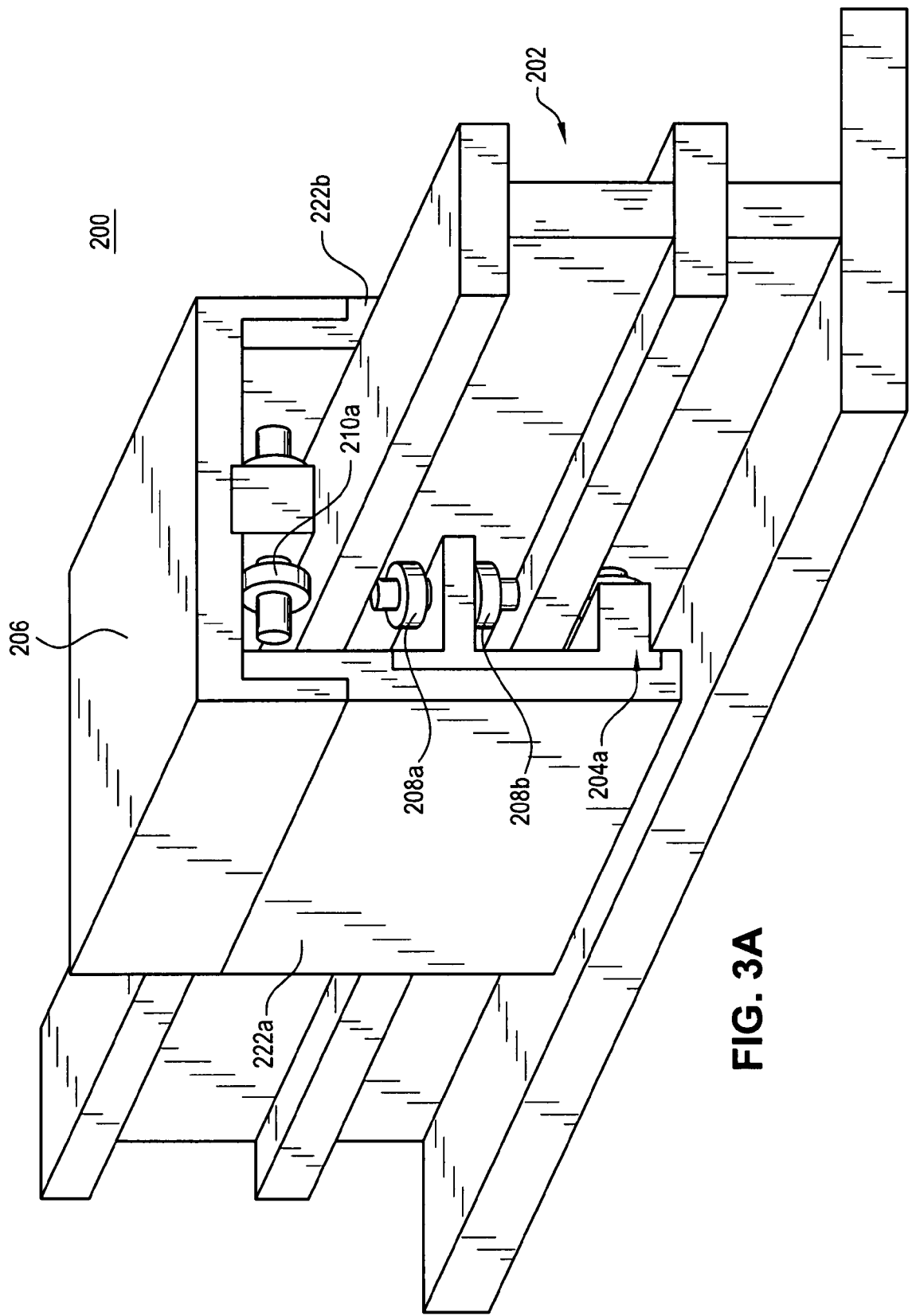
FIG. 3A is a perspective view of linear bearing assembly according to another embodiment of the invention.
Figure 3B:
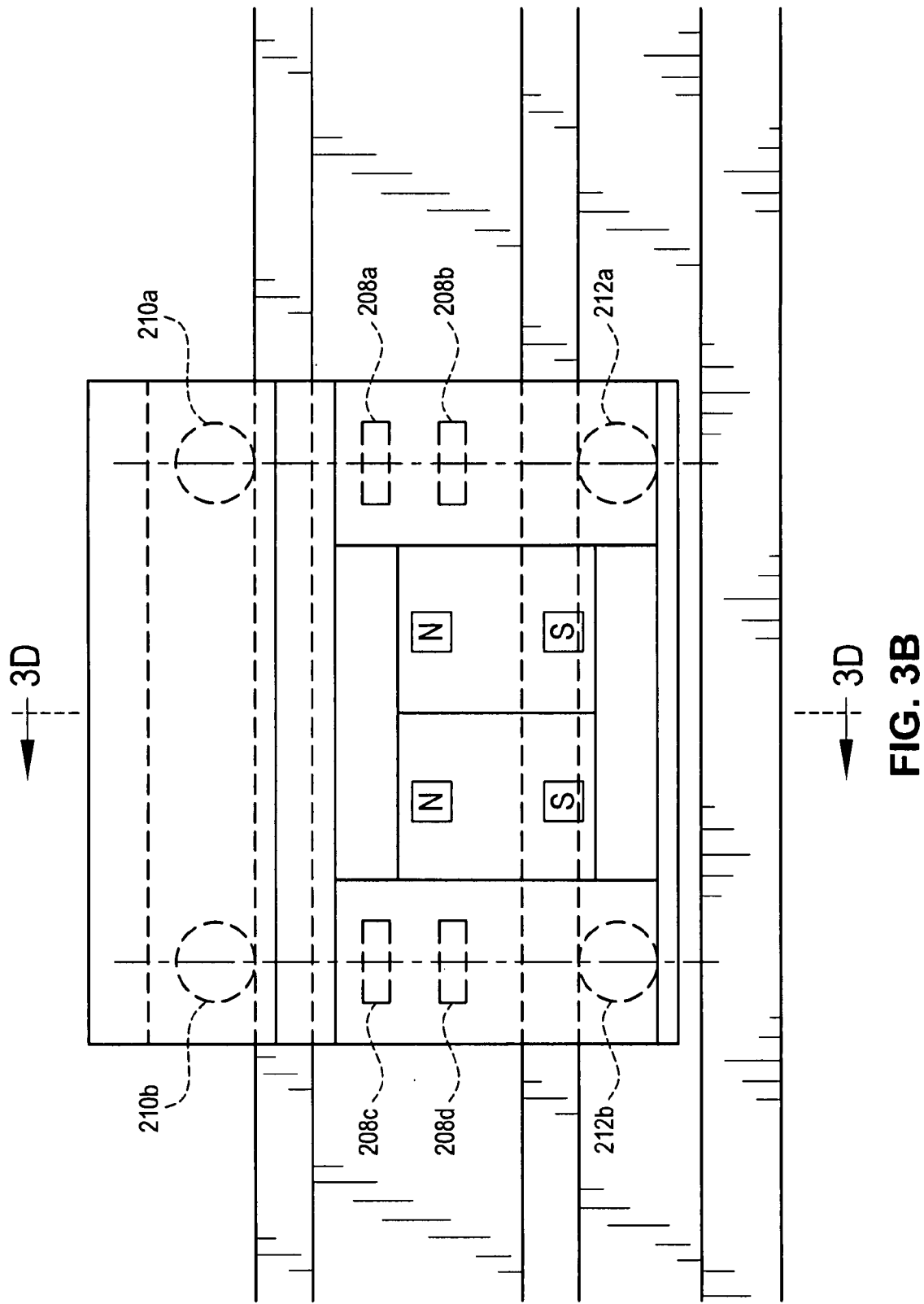
FIG. 3B is a side view of the linear bearing assembly of FIG. 3A.

Referring now to FIGS. 3A, 3B, 3C, and 3D, various views of a linear magnetic bearing assembly according to another embodiment of the present invention are shown. As shown in FIG. 3A, linear bearing assembly 200 comprises a longitudinally-extending inner component 202, two longitudinally-extending outer components 204a and 204b, housing 206 connected to each of the two outer components, and a plurality of wheels for controlling the lateral and vertical movement between the inner component and the two outer components.

Figure 3C:
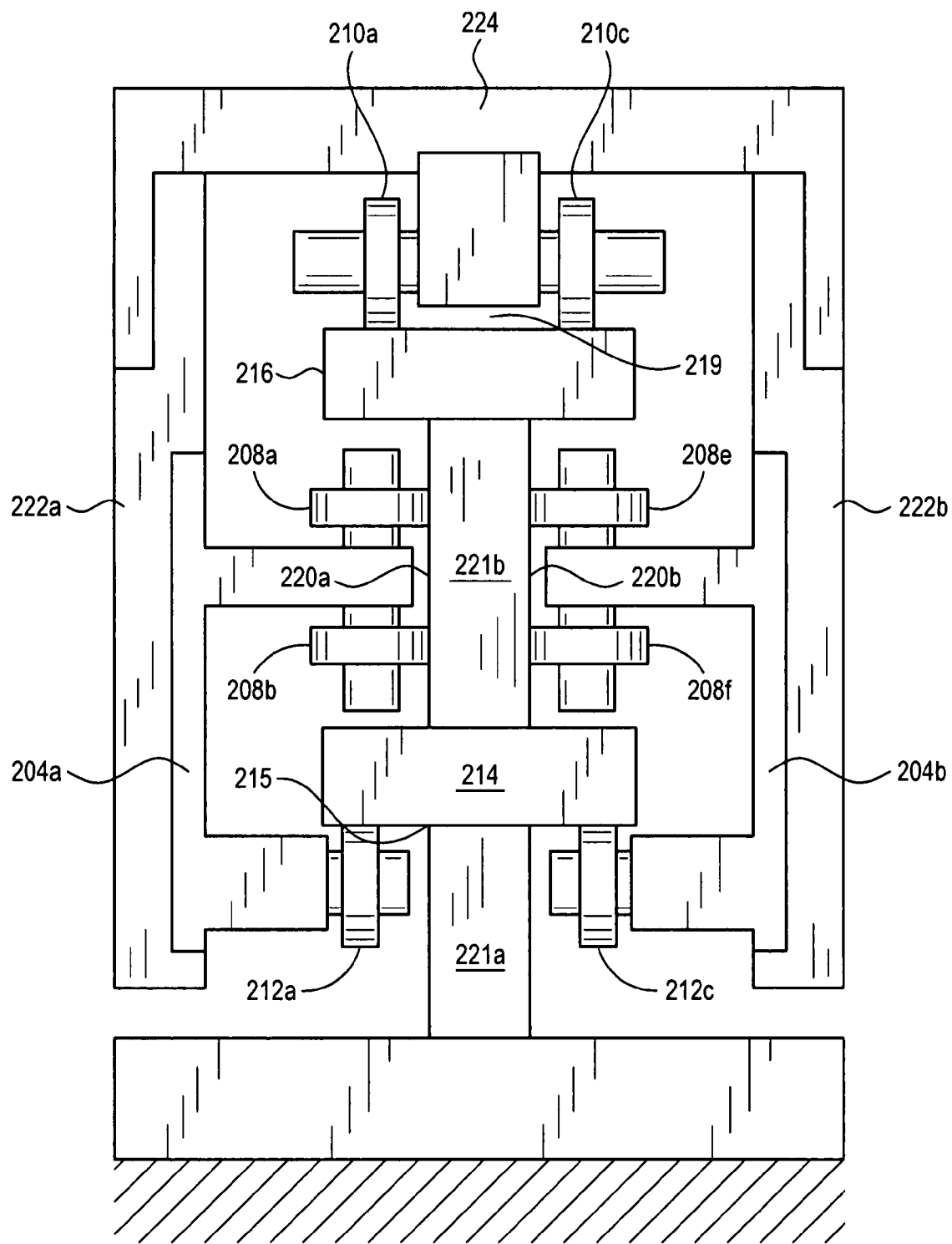
FIG. 3C is an end view of the linear bearing assembly of FIG. 3A.
Figure 3D:
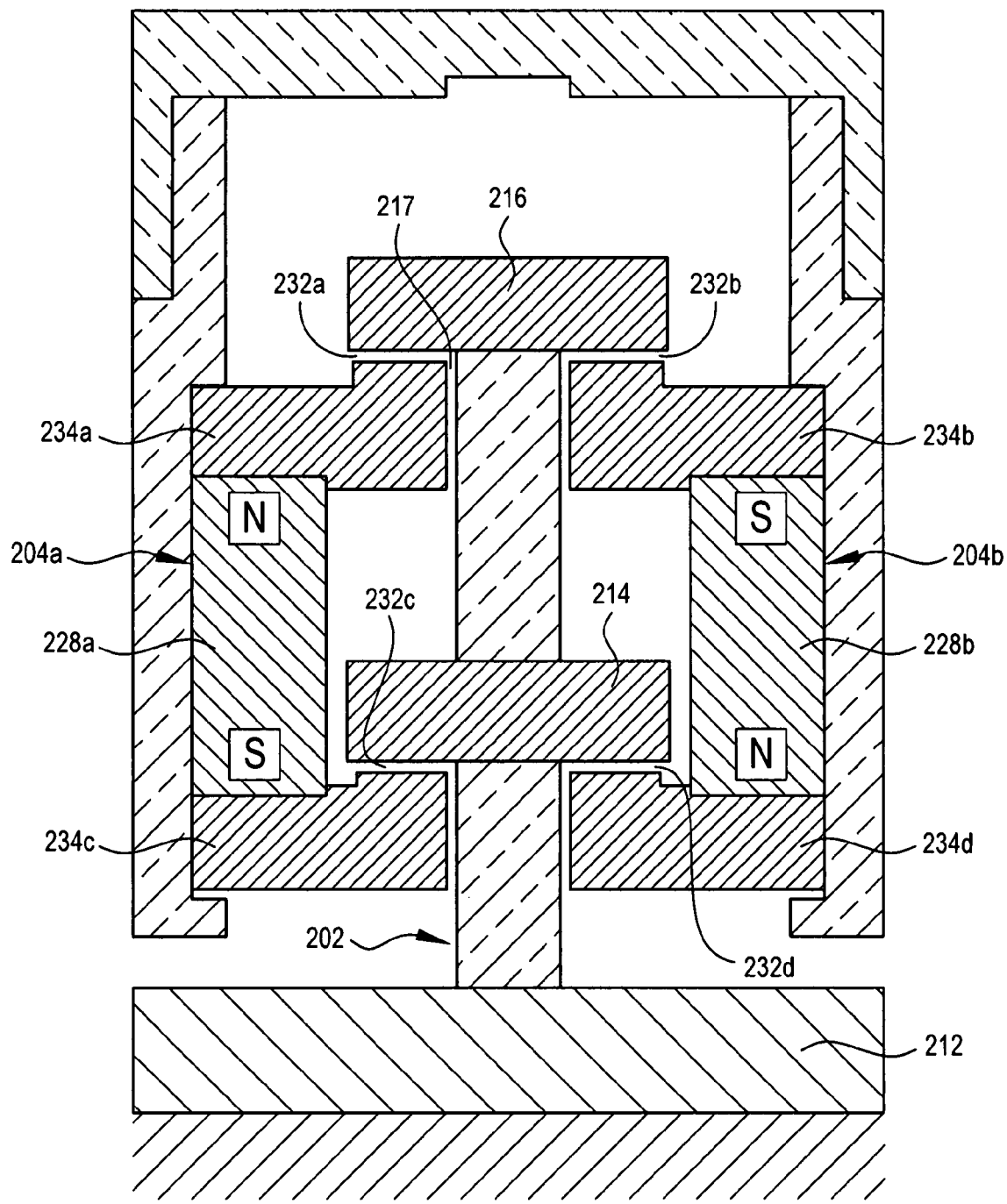
FIG. 3D is a longitudinal cross-sectional view of the linear bearing assembly of FIG. 3A along the line 3D-3D as shown in FIG. 3B.

The components which form the magnetic field are shown in FIG. 3D. Longitudinally-extending inner component 202, which is in the form of a rail, has a base 212, a first beam 221a, a first member 214 having a bottom engaging surface 215, a second beam 221b, and a second member 216 having a bottom engaging surface 217. First member 214 and second member 216 are composed of highly magnetically permeable material to conduct a magnetic field, while the beams 221a and 221b are composed of a non-magnetic material (e.g., brass) in order to maintain the magnetic field. As the material of first member 214 and second member 216 is highly magnetically permeable material, the two bottom engaging surfaces also function as magnetic surfaces. It is not essential that the magnetic surface be the same as the bottom surface or any of the other engaging surfaces, but it may be. It is important the magnetic surface of the component adapted to receive a supplemental load be positioned vertically below the other component. FIG. 3C also shows that member 216 has a top engaging surface 219. Inner component 202 also has at least two side engaging surfaces 220a and 220b. As used herein, the axis of the rail is defined as running along the length of the rail (i.e., into and out of FIGS. 3C and 3D). As shown in the embodiment in FIG. 3C, side engaging surfaces 220a and 220b are formed on the side of beam 221b, although side engaging surfaces can be a part of other areas of inner component 202.

Two longitudinally-extending outer components 204a and 204b are disposed for relative longitudinal movement with inner component 202 along the axis and each has at least one magnetic surface. While various embodiments are contemplated in which either the inner component or the two outer components is the moving component and the other is a stationary component, the embodiment shown in FIGS. 3A-3D provides that the inner component is the stationary component and the outer components are the moving components. Also, either one of the components may contain a magnetic source but, as shown in FIG. 3D, the two outer components each contain a magnetic source material. In an embodiment useful as a rail transportation system, it is preferable for the outer components to contain the magnetic source. If in such an embodiment the inner component comprised a magnetic source, then it would run the risk of attracting stray metallic objects.

In the embodiment shown in FIG. 3D, longitudinally-extending outer component 204a comprises first magnetic source 228a, and second longitudinally-extending outer component 204b comprises second magnetic source 228b. The outer components could comprise together only one magnetic source such as shown in FIG. 4B, discussed below. Magnetic sources 228a and 228b are disposed to provide magnetic moments, as shown by their polarities, north and south, and are aligned to operate in series. Any magnetic material may be used for the magnetic source as described in connection with the first embodiment. The magnetic source may include a permanent magnet material or an electromagnetically excited material, and the outer component may also either be the magnetic material or an electromagnetically excited material. In a rail transportation system, it is preferable that the magnetic source is an electromagnetically excited material.

As can be seen from FIG. 3D, inner component 202 and the two outer components 204a and 204b are positioned to provide for gaps 232a, 232b, 232c and 232d. These gaps are formed or defined by the magnetic surfaces of the two components and across the gaps a magnetic field, formed from the magnetic movement, imparts a magnetic attractive force between the two components. This attractive magnetic force causes a first load in a first direction opposing gravity to be exerted by the stationary component across the gap and against the moving component urging the moving component upward. Thus, in the embodiment shown, a magnetic field can be viewed as flowing from magnetic material 228a to first pole piece 234a, across gap 232a to member 216, then across gap 232b to second pole piece 234b, then across gap 232d across member 214 and across gap 232c, and finally across pole piece 234c and then back to magnetic material 228a. It can be appreciated that, with inner component 202 being grounded, the attractive force would urge outer components 204a and 204b and housing 206 upward, against the force of gravity.

As mentioned above, linear bearing assembly 200 also includes a housing 206 which is connected to each of the two outer components 204a and 204b for mounting the two outer components in a fixed relationship to each other while allowing for relative longitudinal movement between the two outer components and inner component 202. As shown, housing has two legs 222a and 222b, which are connected to each other along crossbar 224 and are respectively connected to outer components 204a and 204b by screws or some other fastener. Housing 206 may take any form sufficient to mount two outer components 204a and 204b in a fixed relationship to each other. Housing 206 may include or be adapted to support a carriage of a train. Thus, it can be appreciated that housing 206 is adapted to accept a supplemental component (e.g., a carriage of a train and/or passengers or cargo of a train) providing a supplemental load (or weight) opposing the first load. Varying loads could be compensated for in a number of ways, for example by adjusting the current in an electromagnet.

The means for controlling the lateral and vertical movement between the inner component and two outer components can include a wide variety of different devices for doing so. As shown in the embodiments in FIGS. 3A and 3C, such means are wheels bearing against various engaging surfaces of the longitudinally-extending inner component 202. In particular, a plurality of side wheels 208a-208f are coupled to outer components 204a and 204b and individually bear against the two side engaging surfaces 220a and 220b of inner component 202. The side wheels control the lateral movement of the outer components relative to the inner component. In addition, a plurality of top wheels 210a-210c are coupled to the outer component and bear against the top engaging surface 219 of member 216. The top wheels control vertically downward movement of the outer components relative to the inner component. A plurality of bottom wheels 212a-212c are coupled to outer components 204a and 204b and bear against bottom engaging surface 215 of member 214. Bottom wheels 212a-212c control vertically upward movement of the outer components relative to the inner component and prevent contact between the magnetic surfaces of the inner component and the outer components. The top wheels and bottom wheels set the maximum and minimum clearances of magnetic gaps 232a-232d. In addition, in view of the magnetic force exerted against outer components 204a and 204b, it can be appreciated that the frictional losses on especially top wheels 210a-210c can be greatly reduced. While the means for controlling the lateral and vertical movement are shown as wheels, other means can be used for controlling the lateral and vertical movement between the components. Such other means include flanges as discussed below in connection with FIGS. 4A and 4B.

In an embodiment of the invention, the two outer components may include two or more longitudinally offset sections. Such offset sections could be viewed as cars of a train, the side of one car being shown in FIG. 3B. Each section has one of the magnetic sources and, according to this embodiment, the direction of the polarity of the magnetic source is opposite in adjacent sections. In other words, the next section or car adjacent the one shown in FIG. 3B would have north at the bottom and south at the top. This configuration serves to demagnetize the inner component or rail or at least limits the magnetism induced on the track.

Figure 4A:
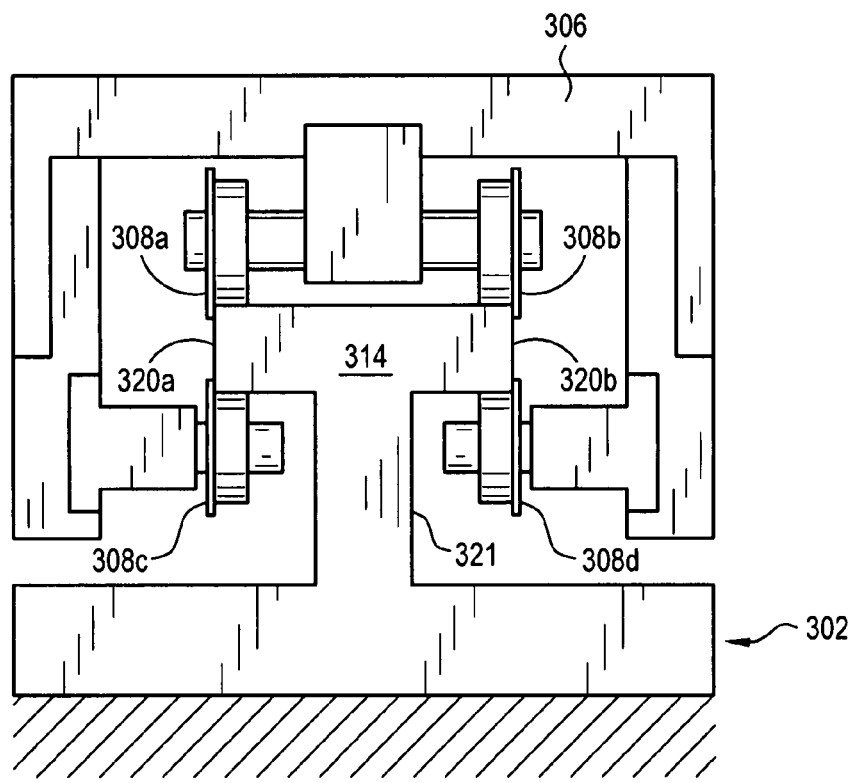
FIG. 4A is an end view of a linear bearing assembly according to another embodiment of the invention.
Figure 4B:
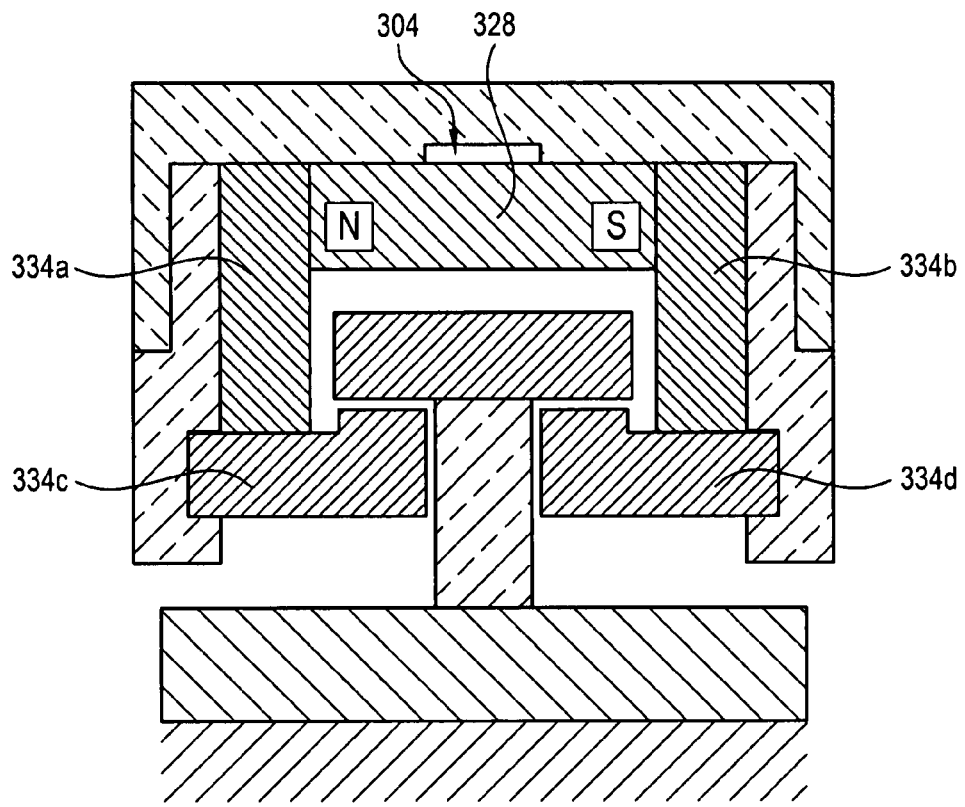
FIG. 4B is a longitudinal cross-sectional view of the linear bearing assembly of FIG. 4A.

The embodiment shown in FIG. 4A is similar to the embodiment shown in FIGS. 3A-3D except that the bearing assembly has only one outer component and the inner component 302 only has one beam 321 and one member 314. Another distinction of this embodiment is that the outer component 304 comprises the magnetic source which provides a magnetic moment in a direction generally transverse to the axial direction. Outer component 304 has a first pole piece 334a in magnetic contact with the magnetic source at a first end having a first polarity (north) and a second pole piece 334b in magnetic contact with the magnetic source at a second end having a second polarity (south) opposite the first polarity. While in the embodiment shown in FIG. 4B outer component 304 has additional pole pieces 334c and 334d to complete the magnetic circuit, such pole pieces could be formed integrally with pole pieces 334a and 334b, respectively. As in the previous embodiment, the pole pieces are made of a highly magnetically permeable material, and member 314 of inner component 302 is also composed of a highly magnetically permeable material. In the embodiment shown in FIG. 4A, the means for controlling the lateral movement between inner component 302 and the outer component 304 comprise two flanges 308a and 308b extending from and mounted to housing 306. Each flange 308a and 308b respectively engages side engaging surfaces 320a and 320b of inner component 302. Although not shown, a drive wheel or gear may extend from housing 306 and engage inner component 302 and a brake pad may also extend from the housing to engage the inner component when braking.

In an alternative embodiment of the linear bearing assembly according to the present invention, the system may be used upside down, namely with the outer components grounded and elongated and the inner component adapted for movement along the outer components.

A linear bearing assembly according to the present invention can be assembled in any number of ways. For example, a longitudinally inner component is first formed. Separately, longitudinally outer components and housing can then be assembled along with the wheels or bearings for controlling lateral and vertical movement of the components relative to one another. After assembling the components, the housing with the two components can be slid onto one end of the inner component. Thereafter, a stop may be placed on the ends of the inner component. Alternatively, the parts could be assembled then magnetized.

Figure 5A:
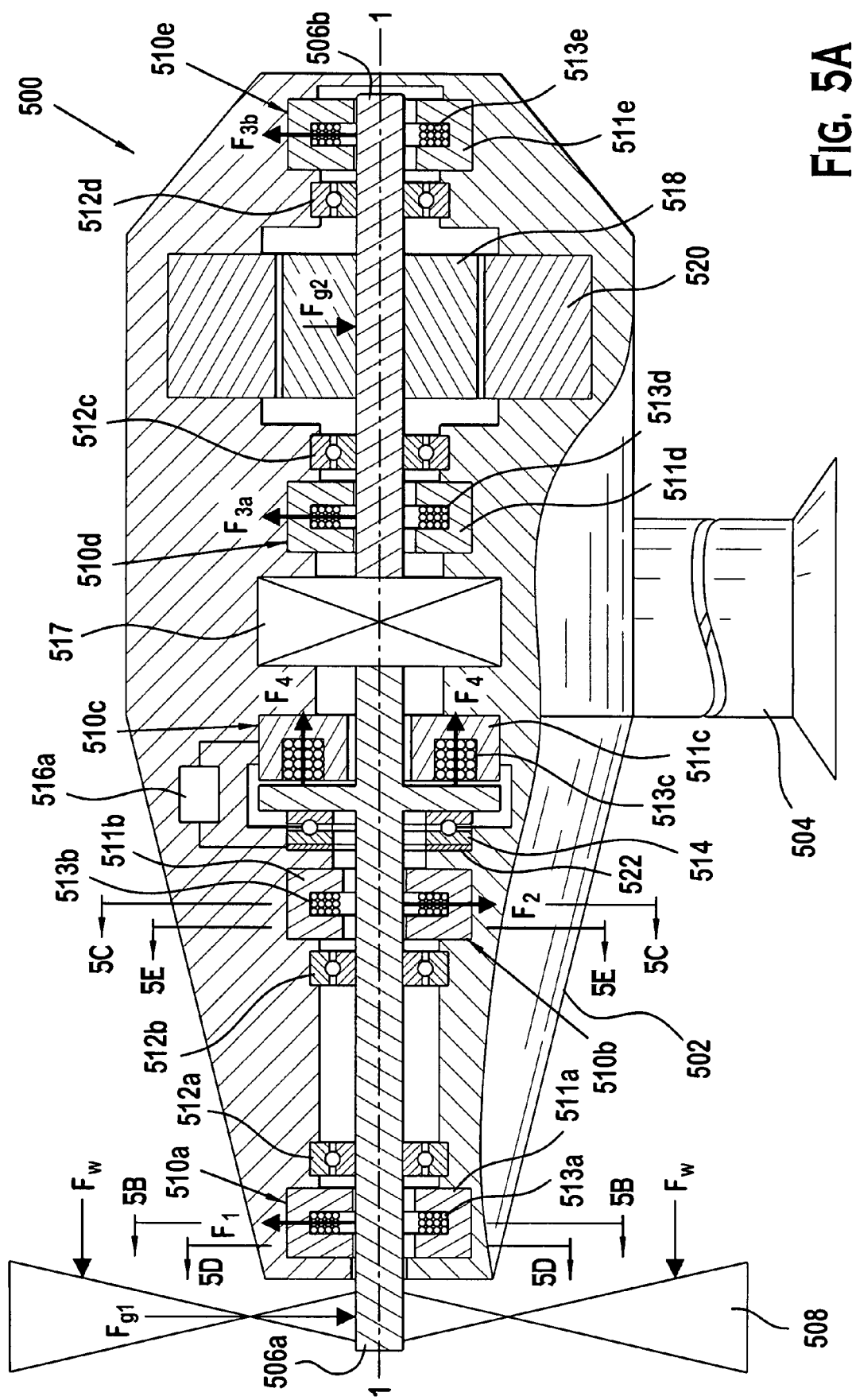
FIG. 5A is partial schematic and partial sectional view of a wind generator system according to an embodiment of the invention.

Referring now to FIG. 5A, an embodiment of a wind generator system 500 for generating electricity is illustrated. The wind generator system 500 includes a stationary frame 502 that is configured to be fixed by a vertical pole 504 to provide the stationary position of the system 500. The vertical pole 504 is coupled to the stationary frame 502 about its center of gravity to stabilize and support the weight of the components within the wind generator system 500.

As also shown in FIG. 5A, the stationary frame 502 has an axis 1 that generally runs along the length of the stationary frame 502. A shaft 506a is disposed along the axis 1 of the stationary frame 502 and is coupled to one or more fan blades 508. Ideally, the fan blades 508 are adapted to receive a wind force $F_w$ such that the shaft 506a radially rotates about the axis 1. The mass of the fan blades 508, however, exerts a downward force $F_{g1}$ on the blades in the direction of gravity such that the proximal portion of the shaft 506a coupled to the fan blades 508 pivots towards the ground, and the distal portion of the shaft 506a opposite the fan blades 508 pivots in a direction opposing gravity. To counteract the pivot force and stabilize shaft 506a, two magnetic sources 510a and 510b are positioned along the length of the shaft 506a, for example, near the proximal and distal portions of shaft 506a.

As illustrated in FIG. 5A, magnetic source 510a is positioned near the proximal portion of shaft 506a and magnetic source 510b is positioned near the distal portion of shaft 506a. Magnetic sources 510a, 510b each include a coil of wire 513a, 513b wound around a core 511a, 511b of highly magnetically permeable material, respectively. When electrical current is passed through the coil of wire 513a of magnetic source 510a, a magnetic field is generated by magnetic source 510a, across annular gaps $G_{g1}$ and $G_{g2}$ to impart a magnetic attractive force $F_1$ on the proximal portion of shaft 506 in a direction opposing gravity. Magnetic attractive force $F_1$ acts in a generally upward direction opposing gravity because annular gap $G_{g1}$ of the top quadrant is smaller than annular gap $G_{g2}$, and thus concentrates stronger attractive force at the top quadrant of shaft 506a. When electrical current is passed through the coil of wire 513b of magnetic source 510b, a magnetic field is generated by magnetic source 510b, across annular gaps $G_{g3}$ and $G_{g4}$ to impart a magnetic attractive force $F_2$ on the distal portion of shaft 506 in the direction of gravity. Magnetic attractive force $F_2$ acts in a generally downward direction with gravity because annular gap $G_{g4}$ of the bottom quadrant is smaller than annular gap $G_{g3}$, and thus concentrates stronger attractive force at the bottom quadrant of shaft 506a. As described above, the term "quadrant" shall mean an arcuate portion of the gap between the two components and could be up to half of the arc of the gap or one quarter of the arc of the gap or something less. For example, the upper quadrant could be an arcuate portion of 45, 60, 90, or 135 degrees, while the lower quadrant would be a complementary angle of 315, 300, 270, and 225 degrees, respectively.

Magnetic attractive force $F_1$ and $F_2$ combined together act to counteract the pivot force due to the mass of the fan blades 508, and thereby stabilize shaft 506a along axis 1 and decrease the load and thus the frictional wear on mechanical bearings 512a and 512b. It is noted that shaft 506 is also composed of high magnetically permeable materials, such as iron, nickel iron, and low carbon steel, which readily conduct magnetic fields. Other highly magnetically permeable materials that may be selected should be sufficiently magnetically permeable to conduct a magnetic field from magnetic source 510a and 510b.

Axial frictional wear on radial mechanical bearings 512a and 512b due to wind force $F_w$ are minimized by magnetic source 510c. Magnetic source 510c is positioned near the distal portion of shaft 506a and includes a coil of wire 513c wound around a core 511c of highly magnetically permeable material. When electrical current is passed through the coil of wire 513c, a magnetic field is generated by magnetic source 510c, across the axial gap between the components to impart a magnetic attractive force $F_4$ on the distal portion of shaft 506 in a direction opposing wind force $F_w$. Magnetic attractive force $F_4$ acts in a generally sideways direction opposing wind force $F_w$ since the axial gap serves to impart attractive force $F_4$ onto shaft 506a.

In a further embodiment, when magnetic sources 510a, 510b, and 510c impart magnetic attractive forces $F_1$, $F_2$, and $F_4$ on shaft 506a, respectively, the stationary frame 502 and shaft 506a are positioned with respect to each other along axis 1 to provide annular gaps $G_{g1}$, $G_{g2}$ $G_{g3}$ and $G_{g4}$ between a surface of magnetic sources 510a and 510b which is parallel to axis 1. Additionally, the axial gap is provided between a surface of magnetic sources 510c which is orthogonal to axis 1. Accordingly, annular gaps $G_{g1}$, $G_{g2}$ $G_{g3}$ and $G_{g4}$ are provided radially between the shaft 506a and magnetic sources 510a and 510b, whereas the axial gap is provided axially between the shaft 506a and magnetic source 510c.

The wind generator system 500 also includes a pressure sensor such as strain gauge 522 that measures the force $F_w$ exerted on shaft 506a by the wind. Additional strain gauges can be used to measure stress and strain on radial mechanical bearings 512a and 512b. In an exemplary embodiment, the strain gauge 522 is configured to send strain gauge signals to a control unit 516a. The control unit 516a monitors the strain gauge 522 and is configured to send a control signal to coil of wire 513c of magnetic source 510c, thereby imparting magnetic attractive force $F_4$ on shaft 506a. In an exemplary embodiment, the control unit 516a selectively controls magnetic source 510c to selectively impart magnetic attractive force $F_4$ on the shaft 506a in the direction opposing wind force $F_w$ to selectively decrease frictional wear on the mechanical bearings.

The distal end of shaft 506a is flexibly coupled to a gear transmission 517. Gear transmission 517 receives kinetic energy from the rotation of shaft 506a and transmits energy to a shaft 506b coupled on an opposite end of the gear transmission 517. In an exemplary embodiment, rotational velocity of shaft 506a is different than the rotational velocity of shaft 506b due to gear ratios of the gear transmission 517. The gear ratio of the gear transmission 517, for example, may increase rotational efficiency of shaft 506b by increasing the number of revolutions per minute of shaft 506b relative to shaft 506a, as is well-known in the art. Thus, the efficiency of electricity generation may be increased.

The wind generator system 500 also includes an electric generator stator 520 coupled to the stationary frame 502. The stator 520 allows an electric generator rotor 518 coupled to shaft 506b to rotate about the axis 1 relative to the stationary frame 502 and generate electricity when the shaft 506b radially rotates about the axis 1. It is not necessary that one of two components be stationary but only that there is relative rotation between the two components. The rotational velocity of shaft 506b may be the same or different than the rotational velocity of the rotor 518 and/or stator 520 to provide efficient electricity generation.

The stationary frame 502 and shaft 506b are positioned with respect to each other along the axis 1 to provide annular gaps as described above between a surface of magnetic sources 510d and 510e which is parallel to the axis 1. Annular gaps are provided radially between the shaft 506b and magnetic sources 510d, 510e and may have the same radial thickness or different thicknesses.

Magnetic sources 510d, 510e each include a coil of wire 513d, 513e wound around a core 511d, 511e of highly magnetically permeable material, respectively. When current is passed through the coil of wire 513d, 513e of magnetic sources 510d and 510e, magnetic fields are generated across annular gaps (as shown) to impart magnetic attractive forces $F_{3a}$ and $F_{3b}$ on shaft 506b in a direction opposing gravity. Magnetic attractive forces $F_{3a}$ and $F_{3b}$ oppose gravitational force $F_{g2}$ due to the mass of the shaft 506b and thereby decrease radial frictional wear on a second set of radial mechanical bearings 512c and 512d. Thus, energy loss in the form of thermal energy from the wind generator system 500 is minimized.

As described above, the wind generator system 500 includes sets of mechanical bearings 512a-d coupled to shafts 506a, 506b and the stationary frame 502. In an exemplary embodiment, the sets of mechanical bearings are radial rotary bearings that contact shafts 506a and 506b. In yet another embodiment, the sets of mechanical bearings 512a-d include at least two pairs of radial rotary bearings that rotate radially as shafts 506a and 506b rotate about axis 1. The sets of mechanical bearings 512a-d allow radial rotation of shaft 506a and 506b about the axis 1 relative to the stationary frame 502 and also provide axial alignment of shafts 506a and 506b with respect to the stationary frame 502. A thrust bearing 514 is disposed proximal of magnetic source 510c and is configured to compensate axial thrust in the direction of magnetic attractive force $F_4$ on the shaft 506a.

Figure 5B:
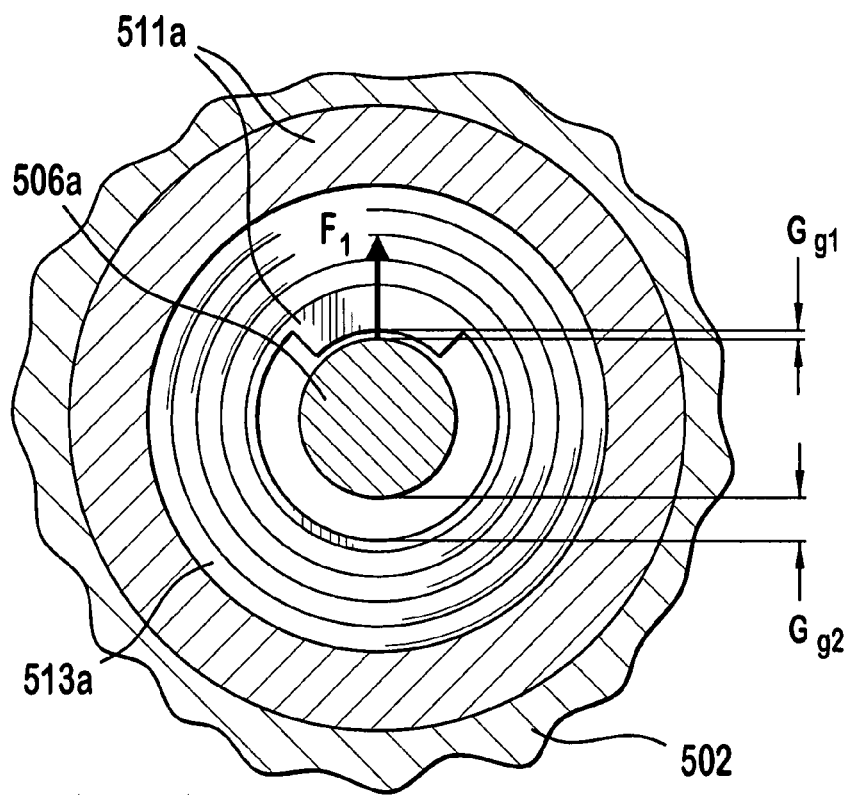
FIG. 5B is a cross-sectional view of the wind generator system of FIG. 5A along the line 5B-5B as shown in FIG. 5A.

Referring now to FIGS. 5A and 5B, a cross sectional view along line 5B-5B of the wind generator system 500 shown in FIG. 5A is illustrated. As shown in FIG. 5A, lines 5B-5B run radially through magnetic source 510a. The magnetic source 510a includes a core 511a having a coil of wire running around the core 511a. Shaft 506a is disposed within an opening defined by the center of the magnetic source 510a such that an annular gap $G_{g1}$, $G_{g2}$ exists between a surface of the magnetic source 510 and shaft 506a. In an exemplary embodiment, when the magnetic source 510a imparts a magnetic attractive force $F_1$ on the proximal portion of shaft 506a, the shaft 506a becomes attracted to the core 511a in a direction opposing gravity such that the annular gap $G_{g1}$ decreases, and annular gap $G_{g2}$ increases.

In the embodiment shown in FIG. 5B, the core 511a of the magnetic source 510a (FIG. 5A) has an extended radial thickness at a top quadrant at an axial location adjacent mechanical bearing 512a such that annular gap $G_{g1}$ is smaller at the top quadrant than a bottom quadrant defined by annular gap $G_{g2}$. The extended radial thickness of the core 511a, localizes greater magnetic attractive fields at the top quadrant when the core 511a is magnetized, thus inducing magnetic attractive force $F_1$ on the proximal portion of shaft 506a in the direction opposing gravity.

Figure 5C:
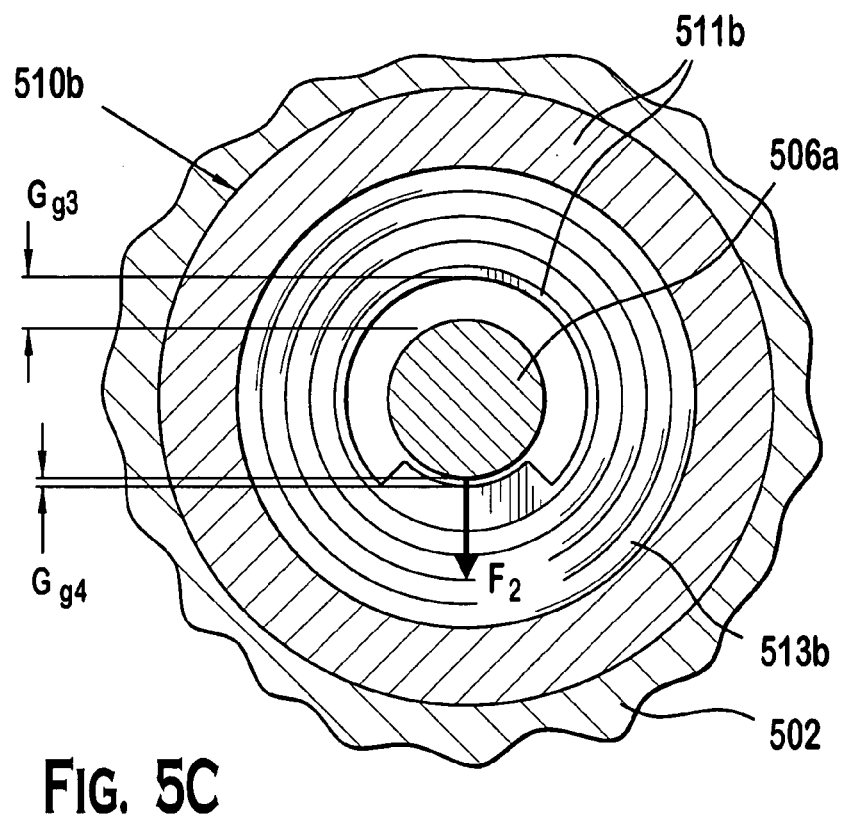
FIG. 5C is a cross-sectional view of the wind generator system of FIG. 5A along the line 5C-5C as shown in FIG. 5A.

Referring now to FIG. 5C, a cross sectional view along line 5C-5C of the wind generator system 500 shown in FIG. 5A is illustrated. As shown in FIG. 5A, lines 5C-5C run radially through magnetic source 510b. The magnetic source 510b includes a core 511b having a coil of wire running around the core 511b. Shaft 506a is disposed within an opening defined by the center of the magnetic source 510b such that an annular gap $G_{g3}$, $G_{g4}$ exists between a surface of the magnetic source 510 and the shaft 506a. In an exemplary embodiment, when the magnetic source 510b imparts a magnetic attractive force $F_2$ on the distal portion of shaft 506a, the shaft 506a becomes attracted to the core 511b in a direction of gravity such that the annular gap $G_{g4}$ decreases, and annular gap $G_{g3}$ increases. This counteracts the pivot force due to the mass of the fan blades 508.

In the embodiment shown in FIG. 5C, the core 511b of the magnetic source 510b (FIG. 5A) has an extended radial thickness at a bottom quadrant at an axial location adjacent mechanical bearings 512b such that annular gap $G_{g4}$ is smaller at the bottom quadrant than a top quadrant defined by annular gap $G_{g3}$. The extended radial thickness of the core 511b, localizes greater magnetic attractive fields at the bottom quadrant when the core 511b is magnetized, thus inducing magnetic attractive force $F_2$ on the distal portion of shaft 506b in the direction of gravity.

Figure 5D:
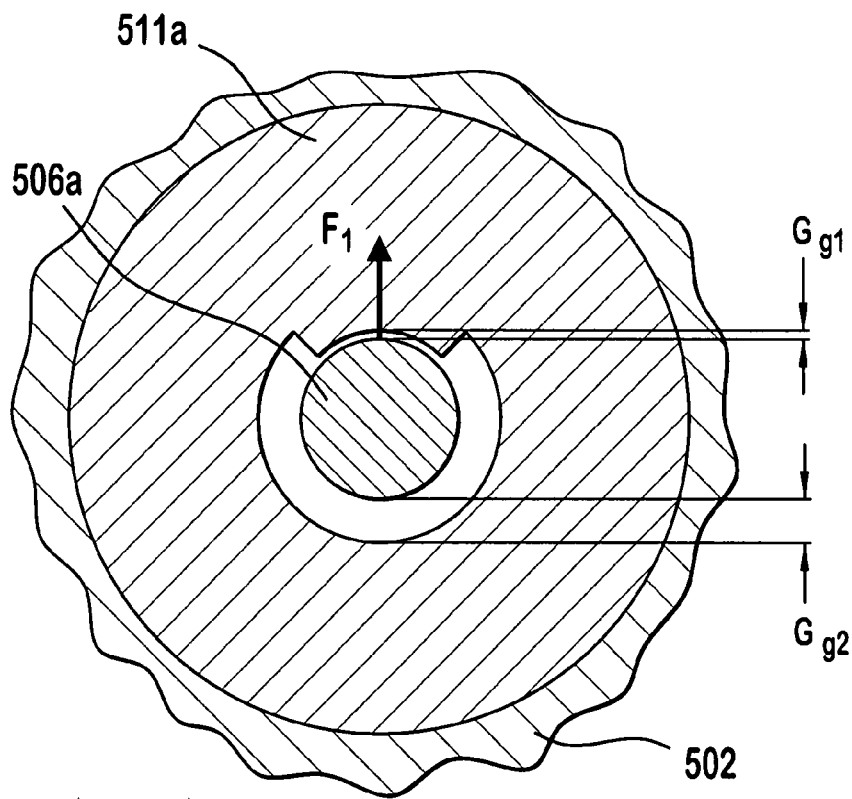
FIG. 5D is a cross-sectional view of the wind generator system of FIG. 5A along the line 5D-5D as shown in FIG. 5A.

Referring now to FIG. 5D, a cross sectional view along line 5D-5D of the wind generator system 500 shown in FIG. 5A is illustrated. As shown in FIG. 5A, lines 5D-5D run radially through the core 511a of magnetic source 510a. Shaft 506a is disposed within an opening defined by the center of the magnetic source 510a such that an annular gap $G_{g1}$, $G_{g2}$ exists between a surface of the core 511a and the shaft 506a. In an exemplary embodiment, when the core 511a imparts a magnetic attractive force $F_1$ on the proximal portion of shaft 506a, the shaft 506a becomes attracted to the core 511a in a direction opposing gravity such that the annular gap $G_{g1}$ decreases, and annular gap $G_{g2}$ increases. This counteracts the pivot force due to the mass of the fan blades 508.

Figure 5E:
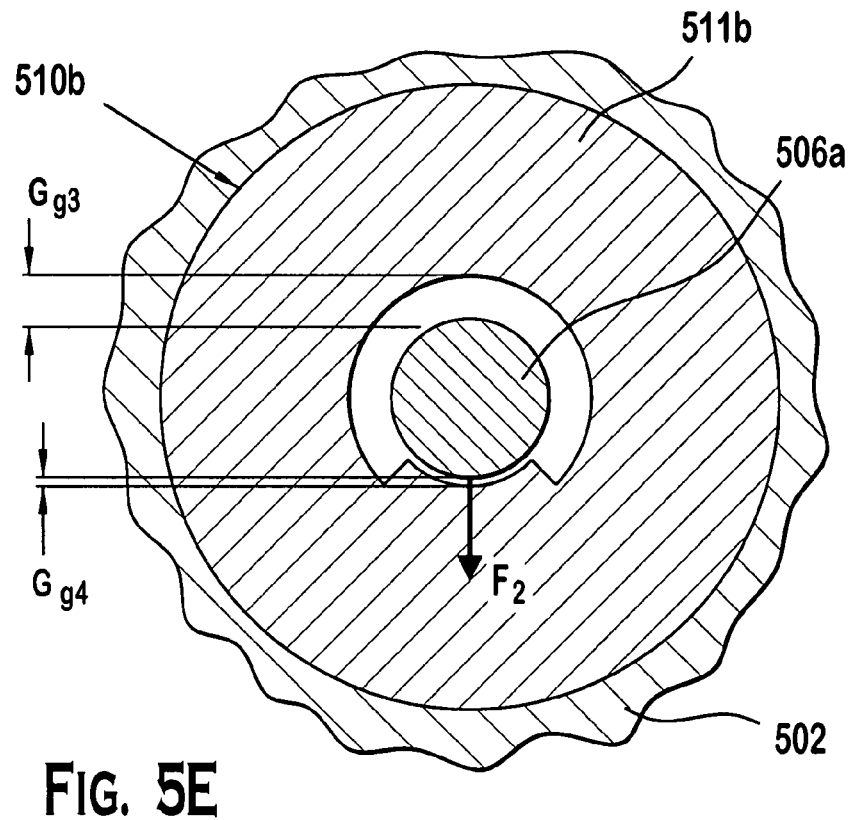
FIG. 5E is a cross-sectional view of the wind generator system of FIG. 5A along the line 5E-5E as shown in FIG. 5A.

Referring now to FIG. 5E, a cross sectional view along line 5E-5E of the wind generator system 500 shown in FIG. 5A is illustrated. As shown in FIG. 5A, lines 5E-5E run radially through the core 511b of magnetic source 510b. Shaft 506a is disposed within an opening defined by the center of the core 511b such that an annular gap $G_{g3}$, $G_{g4}$ exists between a surface of the core 511a and shaft 506a. In an exemplary embodiment, when the core 511b imparts a magnetic attractive force $F_2$ on the distal portion of shaft 506a, the shaft 506a becomes attracted to the core 511b in a direction of gravity such that the annular gap $G_{g4}$ decreases, and annular gap $G_{g3}$ increases. This counteracts the pivot force due to the mass of the fan blades 508.

Although illustrated and described above with reference to certain specific embodiments, the present invention is nevertheless not intended to be limited to the details shown. For example, the rotating component can be radially outward of the stationary component, as opposed to the embodiment shown. Rather, various modifications may be made in the details within the scope and range of equivalents of the claims and without departing from the invention.

What is claimed:

1. A wind generator system comprising:
    a stationary frame having an axis;
    a first shaft disposed along the axis and coupled to one or more fan blades, the fan blades adapted to receive a wind force such that the first shaft radially rotates about the axis, wherein:
        (a) the stationary frame comprises at least one magnetic source and the first shaft comprises a highly magnetically permeable material; and
        (b) the stationary frame and the first shaft are positioned to provide at least one annular gap between a surface of the at least one magnetic source and an opposing surface of the highly magnetically permeable material across which a magnetic field imparts a magnetic attractive force on the shaft in a first direction opposing gravity, a second direction with gravity, and in a third direction opposing the wind force;
    a first set of mechanical bearings coupled to the first shaft and the stationary frame for allowing radial rotation of the first shaft about the axis relative to the stationary frame and for axially aligning the first shaft and the stationary frame, wherein the first shaft and the one or more fan blades are configured to exert against the set of mechanical bearings a load in the direction of gravity and a load in the direction opposing gravity;
    a stator coupled to the stationary frame; and
    a rotor coupled to a second shaft and opposing the stator, the rotor configured to radially rotate about the axis relative to the stationary frame and generate electricity when the second shaft radially rotates about the axis, wherein the second shaft is disposed along the axis and operably coupled to the first shaft via a gear transmission, the gear transmission transferring kinetic energy from the first shaft to radially rotate the second shaft in response to rotation of the first shaft.

2. The wind generator system of claim 1, wherein the second shaft comprises a highly magnetically permeable material, the second shaft positioned to provide at least one annular gap between a surface of the at least one magnetic source and an opposing surface of the highly magnetically permeable material across which a magnetic field imparts a magnetic attractive force on the second shaft in the first direction opposing gravity.

3. The wind generator system of claim 2, wherein the second shaft comprises a second set of mechanical bearings coupled to the second shaft and the stationary frame for allowing radial rotation of the second shaft about the axis relative to the stationary frame and for axially aligning the second shaft and the stationary frame, wherein the second shaft is configured to exert against the second set of mechanical bearings a load in the direction of gravity.

4. The wind generator system of claim 1, wherein the at least one magnetic source comprises a core of highly magnetically permeable material and a coil of wire wound on the core, wherein the core is magnetized by passing a current through the coil of wire.

5. The wind generator system of claim 4, further comprising:
    a control unit configured to send a control signal to the coil of wire to impart the magnetic attractive force on the first shaft in the third direction opposing the wind force.

6. The wind generator system of claim 5, further comprising:

at least one strain gauge configured to measure loads in the direction of the wind force, the strain gauge configured to send a strain gauge signal to the control unit.

7. The wind generator system of claim 4, wherein the core has an increased radial thickness at a top quadrant at an axial position adjacent to the mechanical bearing of the first set of mechanical bearings closest to the one or more fan blades such that the at least one annular gap is smaller at the top quadrant than at a bottom quadrant.

8. The wind generator system of claim 4, wherein the core has an increased radial thickness at a bottom quadrant at an axial position adjacent to the mechanical bearing of the first set of mechanical bearings distal from the one or more fan blades such that the at least one annular gap is smaller at the bottom quadrant than at a top quadrant.

9. The wind generator system of claim 1, wherein the at least one magnetic source is positioned distally from the one or more fan blades and the at least one annular gap comprises a first annular gap extending parallel to the axis to generate the magnetic force in the first direction opposing gravity and in the second direction with gravity, and an axial gap extending orthogonal to the axis to generate the magnetic force in the third direction opposing the wind force.

10. The wind generator system of claim 1, wherein the annular gap is provided radially between the first shaft and the at least one magnetic source.

11. The wind generator system of claim 1, wherein the annular gap is provided radially between the second shaft and the at least one magnetic source.

12. The wind generator system of claim 1, wherein the first set of mechanical bearings are radial rotary bearings.

13. The wind generator system of claim 1, further comprising a thrust bearing against which the wind force is exerted.

14. The wind generator system of claim 1, wherein the first shaft and second shaft are positioned radially inward relative to the stationary frame.

* * * * *